United States Patent
Li et al.

(10) Patent No.: US 10,750,487 B2
(45) Date of Patent: Aug. 18, 2020

(54) WIRELESS COMMUNICATIONS METHOD AND APPARATUS

(71) Applicant: Huawei Technologies Co., Ltd., Shenzhen (CN)

(72) Inventors: Zhongfeng Li, Munich (DE); Liang Xu, Shanghai (CN); Ning Wu, Shanghai (CN); Yongzhao Cao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 75 days.

(21) Appl. No.: 15/995,462

(22) Filed: Jun. 1, 2018

(65) Prior Publication Data

US 2018/0279281 A1 Sep. 27, 2018

Related U.S. Application Data

(63) Continuation of application No. PCT/CN2016/108313, filed on Dec. 2, 2016.

(30) Foreign Application Priority Data

Dec. 3, 2015 (CN) .......................... 2015 1 0875575

(51) Int. Cl.
*H04W 72/04* (2009.01)
*H04L 1/18* (2006.01)
*H04L 5/00* (2006.01)

(52) U.S. Cl.
CPC ......... *H04W 72/042* (2013.01); *H04L 1/1812* (2013.01); *H04L 5/0053* (2013.01); *H04W 72/0453* (2013.01)

(58) Field of Classification Search
None
See application file for complete search history.

(56) References Cited

U.S. PATENT DOCUMENTS

2008/0248824 A1* 10/2008 Fukui ................ H04W 72/1289
455/509
2010/0232302 A1* 9/2010 Fukui .................. H04B 7/2621
370/252

(Continued)

FOREIGN PATENT DOCUMENTS

CN 101478760 A 7/2009
CN 101765119 A 6/2010

(Continued)

OTHER PUBLICATIONS

JP/2018-528310, Decision of Dismissal of Amendment, dated Mar. 3, 2020.

Primary Examiner — Diane L Lo
(74) Attorney, Agent, or Firm — Leydig, Voit & Mayer, Ltd.

(57) ABSTRACT

A wireless communications method is provided and applied to a communications system using a frequency domain resource with a specified bandwidth. The frequency domain resource is divided into at least two frequency domain resource groups, each frequency domain resource group includes at least one resource block, the at least two frequency domain resource groups belong to a same cell. The method includes: determining, from the at least two frequency domain resource groups, a target frequency domain resource group to be allocated to a target terminal device, where the target frequency domain resource group includes at least one frequency domain resource group; sending first indication information to the target terminal device, where the first indication information is used to indicate the target frequency domain resource group; and performing wireless communication with the target terminal device by using the target frequency domain resource group. Therefore, different user requirements can be flexibly met.

11 Claims, 7 Drawing Sheets

(56) References Cited

U.S. PATENT DOCUMENTS

| | | |
|---|---|---|
| 2011/0269493 A1 | 11/2011 | Zhu et al. |
| 2012/0039267 A1 | 2/2012 | Nagata et al. |
| 2014/0126485 A1 | 5/2014 | Chen et al. |
| 2014/0334429 A1 | 11/2014 | Damnjanovic et al. |
| 2015/0003370 A1* | 1/2015 | Yokomakura ......... H04W 52/24 370/329 |
| 2015/0078313 A1 | 3/2015 | Nakao et al. |

FOREIGN PATENT DOCUMENTS

| | | |
|---|---|---|
| EP | 2141946 A1 | 1/2010 |
| JP | 2010161597 A | 7/2010 |
| JP | 2013243725 A | 12/2013 |
| JP | 2014195291 A | 10/2014 |
| WO | 2006079424 A1 | 8/2006 |
| WO | 2008003815 A1 | 1/2008 |
| WO | 2010016222 A1 | 2/2010 |
| WO | 2010073477 A1 | 7/2010 |
| WO | 2013091225 A1 | 6/2013 |
| WO | 2014070761 A1 | 5/2014 |
| WO | 2014209191 A1 | 12/2014 |

* cited by examiner

100

```
┌─────────────────────────────────────────────────┐
│ A network device determines, from at least two  │
│ frequency domain resource groups, a target      │
│ frequency domain resource group to be allocated │         S110
│ to a target terminal device, where the target   │
│ frequency domain resource group includes at     │
│ least one frequency domain resource group       │
└─────────────────────────────────────────────────┘
                         │
                         ▼
┌─────────────────────────────────────────────────┐
│ The network device sends first indication       │
│ information to the target terminal device, where│         S120
│ the first indication information is used to     │
│ indicate the target frequency domain resource   │
│ group                                           │
└─────────────────────────────────────────────────┘
                         │
                         ▼
┌─────────────────────────────────────────────────┐
│ The network device performs wireless            │
│ communication with the target terminal device   │         S130
│ by using the target frequency domain resource   │
│ group                                           │
└─────────────────────────────────────────────────┘
```

FIG. 9

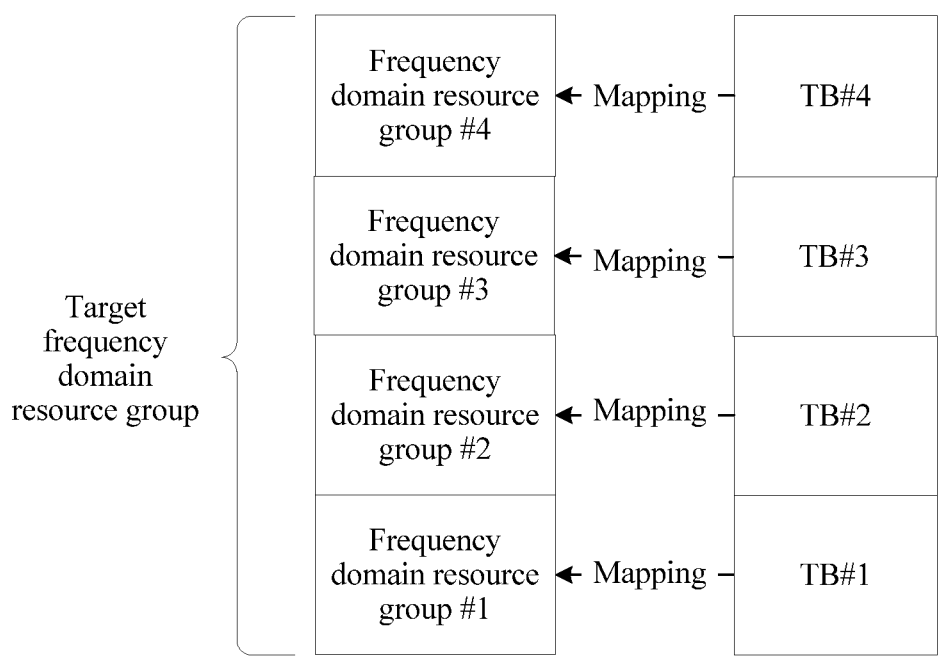

A target terminal device receives first indication information sent by a network device, where the first indication information is used to indicate a target frequency domain resource group, the target frequency domain resource group is determined by the network device from at least two frequency domain resource groups, and the target frequency domain resource group includes at least one frequency domain resource group — S210

The target terminal device performs wireless communication with the network device by using the target frequency domain resource group — S220

FIG. 11

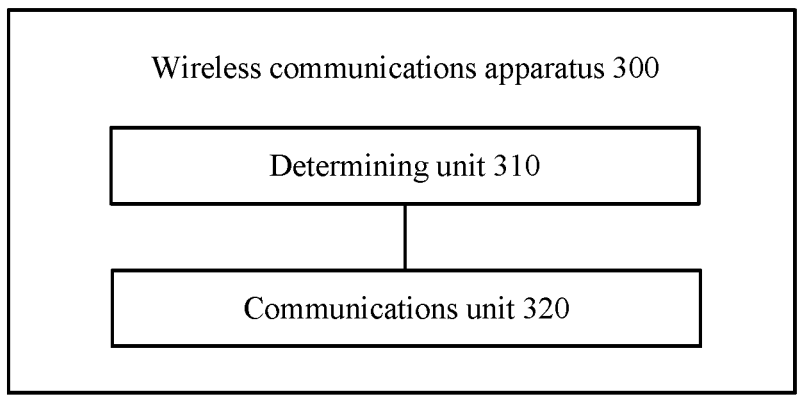

FIG. 12

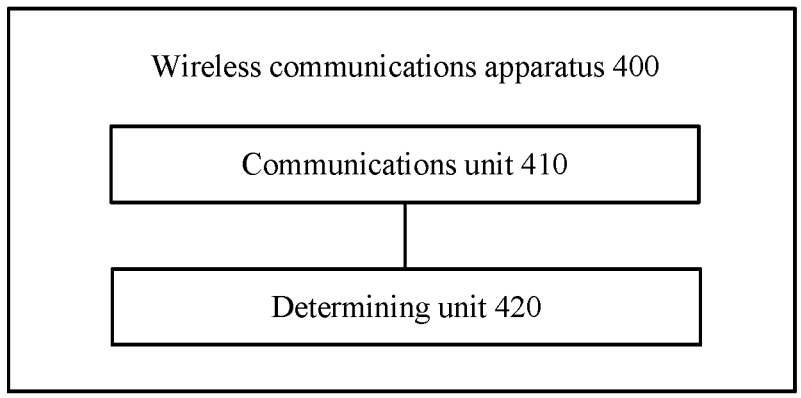

FIG. 13

WIRELESS COMMUNICATIONS METHOD AND APPARATUS

CROSS-REFERENCE TO RELATED APPLICATIONS

This application is a continuation of International Application No. PCT/CN2016/108313, filed on Dec. 2, 2016, which claims priority to Chinese Patent Application No. 201510875575.2, filed on Dec. 3, 2015. The disclosures of the aforementioned applications are hereby incorporated by reference in their entireties.

TECHNICAL FIELD

Embodiments of the present invention relate to the communications field, and more specifically, to a wireless communications method and apparatus.

BACKGROUND

With development of mobile Internet technologies, a communications system such as a Long Term Evolution (LTE) system can provide a 100 megahertz (MHz) or even higher bandwidth.

In addition, communication services are increasingly diverse. For example, from a service type perspective, there is a conventional service such as a voice service or a short message service and also a big data service such as a video service or a high-definition image service. From a transmission rate perspective, there is a low-rate service and also a high-rate service. Different services have different requirements for a bandwidth of a frequency domain resource. For example, if a user has a relatively low bandwidth requirement, to reduce costs, there may be a terminal device with relatively low processing performance (for example, the terminal device can process transmission only on a frequency domain resource with a relatively low bandwidth). Consequently, the terminal device with relatively low performance cannot be used in the foregoing high-bandwidth system.

How to flexibly meet different user requirements in a high-bandwidth communications system becomes an urgent problem to be resolved in the industry.

SUMMARY

Embodiments of the present invention provide a wireless communications method and apparatus, to flexibly meet different user requirements.

According to a first aspect, a wireless communication method is provided, applied to a communications system using a frequency domain resource with a specified bandwidth, where the frequency domain resource is divided into at least two frequency domain resource groups, each frequency domain resource group includes at least one resource block, the at least two frequency domain resource groups belong to a same cell, and the method includes: determining, by a network device from the at least two frequency domain resource groups, a target frequency domain resource group to be allocated to a target terminal device, where the target frequency domain resource group includes at least one frequency domain resource group; sending, by the network device, first indication information to the target terminal device, where the first indication information is used to indicate the target frequency domain resource group; and performing, by the network device, wireless communication with the target terminal device by using the target frequency domain resource group.

With reference to the first aspect, in a first implementation of the first aspect, the target frequency domain resource group includes at least two frequency domain resource groups, and the performing, by the network device, wireless communication with the target terminal device by using the target frequency domain resource group includes: transmitting, by the network device, at least two transport blocks TBs to the target terminal device by using the target frequency domain resource group, where a first TB in the at least two TBs is carried in a first frequency domain resource group in the target frequency domain resource group, a second TB in the at least two TBs is carried in a second frequency domain resource group in the target frequency domain resource group, and the first frequency domain resource group is different from the second frequency domain resource group.

With reference to the first aspect and the foregoing implementation of the first aspect, in a second implementation of the first aspect, the performing, by the network device, wireless communication with the target terminal device by using the target frequency domain resource group includes: transmitting, by the network device, at least three transport blocks TBs to the target terminal device by using the target frequency domain resource group, where the target frequency domain resource group includes at least two frequency domain resource groups, and at least one frequency domain resource group in the target frequency domain resource is used to carry at least two TBs; or the target frequency domain resource group includes at least three frequency domain resource groups, and each frequency domain resource group in the target frequency domain resource group is used to carry at least one TB.

With reference to the first aspect and the foregoing implementations of the first aspect, in a third implementation of the first aspect, the determining, by a network device from the at least two frequency domain resource groups, a target frequency domain resource group to be allocated to a target terminal device includes: receiving, by the network device, terminal capability information sent by the target terminal device, where the terminal capability information is used to indicate a maximum width of a frequency domain resource that can be processed by the target terminal device; and determining, by the network device from the at least two frequency domain resource groups according to the terminal capability information, the target frequency domain resource group to be allocated to the target terminal device.

With reference to the first aspect and the foregoing implementations of the first aspect, in a fourth implementation of the first aspect, the at least two frequency domain resource groups are continuously distributed in the frequency domain resource.

With reference to the first aspect and the foregoing implementations of the first aspect, in a fifth implementation of the first aspect, the at least two frequency domain resource groups include a primary frequency domain resource group and at least one secondary frequency domain resource group.

With reference to the first aspect and the foregoing implementations of the first aspect, in a sixth implementation of the first aspect, the sending, by the network device, first indication information to the target terminal device includes: sending, by the network device, the first indication information to the target terminal device by using the primary frequency domain resource group.

With reference to the first aspect and the foregoing implementations of the first aspect, in a seventh implementation of the first aspect, a control channel is configured in the primary frequency domain resource group, the control channel in the primary frequency domain resource group is used to transmit scheduling information of all frequency domain resource groups used in one scheduling period, and the performing, by the network device, wireless communication with the target terminal device by using the target frequency domain resource group includes: sending, by the network device, scheduling information of the target frequency domain resource group to the target terminal device by using the control channel in the primary frequency domain resource group.

With reference to the first aspect and the foregoing implementations of the first aspect, in an eighth implementation of the first aspect, a control channel is configured in each frequency domain resource group, each control channel is used to transmit scheduling information of a frequency domain resource group to which the control channel belongs, and the performing, by the network device, wireless communication with the target terminal device by using the target frequency domain resource group includes: sending, by the network device, the scheduling information of the target frequency domain resource group to the target terminal device by using a control channel in the target frequency domain resource group.

With reference to the first aspect and the foregoing implementations of the first aspect, in a ninth implementation of the first aspect, an uplink feedback channel is configured in the primary frequency domain resource group, the uplink feedback channel in the primary frequency domain resource group is used to transmit feedback information of downlink transmission carried in all frequency domain resource groups that are used in one downlink transmission period, and the performing, by the network device, wireless communication with the target terminal device by using the target frequency domain resource group includes: receiving, by the network device by using the uplink feedback channel in the primary frequency domain resource group, feedback information that is sent by the target terminal device and that is of downlink transmission carried in the target frequency domain resource group.

With reference to the first aspect and the foregoing implementations of the first aspect, in a tenth implementation of the first aspect, an uplink feedback channel is configured in each frequency domain resource group, each uplink feedback channel is used to transmit feedback information of downlink transmission carried in a frequency domain resource group to which the uplink feedback channel belongs, and the performing, by the network device, wireless communication with the target terminal device by using the target frequency domain resource group includes: receiving, by the network device by using an uplink feedback channel in the target frequency domain resource group, the feedback information that is sent by the target terminal device and that is of the downlink transmission carried in the target frequency domain resource group.

With reference to the first aspect and the foregoing implementations of the first aspect, in an eleventh implementation of the first aspect, a downlink feedback channel is configured in the primary frequency domain resource group, the downlink feedback channel in the primary frequency domain resource group is used to transmit feedback information of uplink transmission carried in all frequency domain resource groups that are used in one uplink transmission period, and the performing, by the network device, wireless communication with the target terminal device by using the target frequency domain resource group includes: sending, by the network device to the target terminal device by using the downlink feedback channel in the primary frequency domain resource group, feedback information of uplink transmission carried in the target frequency domain resource group.

With reference to the first aspect and the foregoing implementations of the first aspect, in a twelfth implementation of the first aspect, a downlink feedback channel is configured in each frequency domain resource group, each downlink feedback channel is used to transmit feedback information of uplink transmission carried in a frequency domain resource group to which the downlink feedback channel belongs, and the performing, by the network device, wireless communication with the target terminal device by using the target frequency domain resource group includes: sending, by the network device to the target terminal device by using a downlink feedback channel in the target frequency domain resource group, the feedback information of the uplink transmission carried in the target frequency domain resource group.

With reference to the first aspect and the foregoing implementations of the first aspect, in a thirteenth implementation of the first aspect, the at least two frequency domain resource groups are in a one-to-one correspondence with at least two hybrid automatic repeat request HARQ entities, each HARQ entity is configured to perform HARQ processing for a corresponding frequency domain resource group, and the performing, by the network device, wireless communication with the target terminal device by using the target frequency domain resource group includes: determining, by the network device, a HARQ entity corresponding to the target frequency domain resource group; and performing, by the network device according to the HARQ entity corresponding to the target frequency domain resource group, HARQ processing for transmission carried in the target frequency domain resource group.

According to a second aspect, a wireless communication method is provided, applied to a communications system using a frequency domain resource with a specified bandwidth, where the frequency domain resource is divided into at least two frequency domain resource groups, each frequency domain resource group includes at least one resource block, the at least two frequency domain resource groups belong to a same cell, and the method includes: receiving, by a target terminal device, first indication information sent by a network device, where the first indication information is used to indicate a target frequency domain resource group, the target frequency domain resource group is determined by the network device from the at least two frequency domain resource groups, and the target frequency domain resource group includes at least one frequency domain resource group; and performing, by the target terminal device, wireless communication with the network device by using the target frequency domain resource group.

With reference to the second aspect, in a first implementation of the second aspect, the target frequency domain resource group includes at least two frequency domain resource groups, and the performing, by the target terminal device, wireless communication with the network device by using the target frequency domain resource group includes: transmitting, by the target terminal device, at least two transport blocks TBs to the network device by using the target frequency domain resource group, where a first TB in the at least two TBs is carried in a first frequency domain resource group in the target frequency domain resource group, a second TB in the at least two TBs is carried in a second frequency domain resource group in the target frequency domain resource group, and the first frequency domain resource group is different from the second frequency domain resource group.

With reference to the second aspect and the foregoing implementation of the second aspect, in a second implementation of the second aspect, the performing, by the target terminal device, wireless communication with the network device by using the target frequency domain resource group includes: transmitting, by the target terminal device, at least three transport blocks TBs to the network device by using the target frequency domain resource group, where the target frequency domain resource group includes at least two frequency domain resource groups, and at least one frequency domain resource group in the target frequency domain resource is used to carry at least two TBs; or the target frequency domain resource group includes at least three frequency domain resource groups, and each frequency domain resource group in the target frequency domain resource group is used to carry at least one TB.

With reference to the second aspect and the foregoing implementations of the second aspect, in a third implementation of the second aspect, the method further includes: sending, by the target terminal device, terminal capability information to the network device, where the terminal capability information is used to indicate a maximum width of a frequency domain resource that can be processed by the target terminal device, so that the network device determines the target frequency domain resource group according to the terminal capability information.

With reference to the second aspect and the foregoing implementations of the second aspect, in a fourth implementation of the second aspect, the at least two frequency domain resource groups are continuously distributed in the frequency domain resource.

With reference to the second aspect and the foregoing implementations of the second aspect, in a fifth implementation of the second aspect, the at least two frequency domain resource groups include a primary frequency domain resource group and at least one secondary frequency domain resource group.

With reference to the second aspect and the foregoing implementations of the second aspect, in a sixth implementation of the second aspect, the receiving, by a target terminal device, first indication information sent by a network device includes: receiving, by the target terminal device by using the primary frequency domain resource group, the first indication information sent by the network device.

With reference to the second aspect and the foregoing implementations of the second aspect, in a seventh implementation of the second aspect, a control channel is configured in the primary frequency domain resource group, the control channel in the primary frequency domain resource group is used to transmit scheduling information of all frequency domain resource groups used in one scheduling period, and the performing, by the target terminal device, wireless communication with the network device by using the target frequency domain resource group includes: receiving, by the target terminal device by using the control channel in the primary frequency domain resource group, scheduling information that is sent by the network device and that is of the target frequency domain resource group.

With reference to the second aspect and the foregoing implementations of the second aspect, in an eighth implementation of the second aspect, a control channel is configured in each frequency domain resource group, each control channel is used to transmit scheduling information of a frequency domain resource group to which the control channel belongs, and the performing, by the target terminal device, wireless communication with the network device by using the target frequency domain resource group includes: receiving, by the target terminal device by using a control channel in the target frequency domain resource group, the scheduling information that is sent by the network device and that is of the target frequency domain resource group.

With reference to the second aspect and the foregoing implementations of the second aspect, in a ninth implementation of the second aspect, an uplink feedback channel is configured in the primary frequency domain resource group, the uplink feedback channel in the primary frequency domain resource group is used to transmit feedback information of downlink transmission carried in all frequency domain resource groups that are used in one downlink transmission period, and the performing, by the target terminal device, wireless communication with the network device by using the target frequency domain resource group includes: sending, by the target terminal device to the network device by using the uplink feedback channel in the primary frequency domain resource group, feedback information of downlink transmission carried in the target frequency domain resource group.

With reference to the second aspect and the foregoing implementations of the second aspect, in a tenth implementation of the second aspect, an uplink feedback channel is configured in each frequency domain resource group, each uplink feedback channel is used to transmit feedback information of downlink transmission carried in a frequency domain resource group to which the uplink feedback channel belongs, and the performing, by the target terminal device, wireless communication with the network device by using the target frequency domain resource group includes: sending, by the target terminal device to the network device by using an uplink feedback channel in the target frequency domain resource group, the feedback information of the downlink transmission carried in the target frequency domain resource group.

With reference to the second aspect and the foregoing implementations of the second aspect, in an eleventh implementation of the second aspect, a downlink feedback channel is configured in the primary frequency domain resource group, the downlink feedback channel in the primary frequency domain resource group is used to transmit feedback information of uplink transmission carried in all frequency domain resource groups that are used in one uplink transmission period, and the performing, by the target terminal device, wireless communication with the network device by using the target frequency domain resource group includes: receiving, by the target terminal device by using the downlink feedback channel in the primary frequency domain resource group, feedback information that is sent by the network device and that is of uplink transmission carried in the target frequency domain resource group.

With reference to the second aspect and the foregoing implementations of the second aspect, in a twelfth implementation of the second aspect, a downlink feedback channel is configured in each frequency domain resource group, each downlink feedback channel is used to transmit feedback information of uplink transmission carried in a frequency domain resource group to which the downlink feedback channel belongs, and the performing, by the target terminal device, wireless communication with the network device by using the target frequency domain resource group includes: receiving, by the target terminal device by using a downlink feedback channel in the target frequency domain resource group, the feedback information that is sent by the network device and that is of the uplink transmission carried in the target frequency domain resource group.

According to a third aspect, a wireless communications apparatus is provided, including units configured to perform all steps in the first aspect and all the implementations of the first aspect.

According to a fourth aspect, a wireless communications apparatus is provided, including units configured to perform all steps in the second aspect and all the implementations of the first aspect.

According to the wireless communications method and apparatus in the embodiments of the present invention, a frequency domain resource provided by a system is divided into at least two frequency domain resource groups, and when a terminal device needs to perform wireless communication, one or more frequency domain resource groups may be allocated to the terminal device from the at least two frequency domain resource groups, to support the terminal device in performing wireless communication, so that a corresponding frequency domain resource can be provided to the terminal device based on a requirement of the terminal device. Therefore, different user requirements can be flexibly met.

BRIEF DESCRIPTION OF DRAWINGS

FIG. 9 is a schematic flowchart of a wireless communication method according to an embodiment of the present invention;

FIG. 10 is a schematic flowchart of an example of a TB mapping manner according to an embodiment of the present invention;

FIG. 11 is a schematic flowchart of a wireless communication method according to another embodiment of the present invention;

FIG. 12 is a schematic block diagram of a wireless communications apparatus according to an embodiment of the present invention;

FIG. 13 is a schematic block diagram of a wireless communications apparatus according to another embodiment of the present invention;

DESCRIPTION OF EMBODIMENTS

Figure 1:
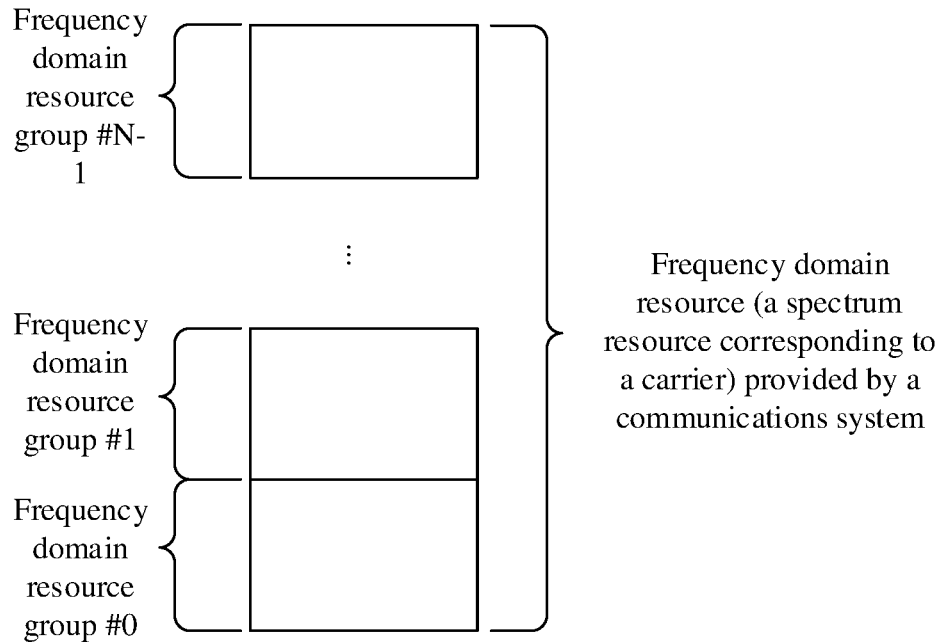
FIG. 1 is a schematic diagram of an example of a division manner of a frequency domain resource according to an embodiment of the present invention.

The following clearly and completely describes the technical solutions in the embodiments of the present invention with reference to the accompanying drawings in the embodiments of the present invention.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. Both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may perform communication by using a local process and/or a remote process and according to a signal having one or more data packets (for example, data from one component interacting with another component in a local system, a distributed system, and/or across a network such as the Internet interacting with another system by using the signal).

In the embodiments of the present invention, the computer includes a hardware layer, an operating system layer running above the hardware layer, and an application layer running above the operating system layer. The hardware layer includes hardware such as a CPU, a memory management unit (MMU), and a memory (also referred to as a storage). The operating system may be any one or more computer operating systems that implement service processing by using a process, for example, a Linux system, a Unix system, an Android system, an iOS system, or a Windows system. This is not specifically limited in the present invention. The application layer includes applications such as a browser, an address book, word processing software, and instant messaging software. It should be understood that the above-enumerated computer device is only an example for description. This is not specifically limited in the present invention.

The solutions in the embodiments of the present invention may be applied to an existing cellular communications system, for example, a Global System for Mobile Communications (GSM), a Wideband Code Division Multiple Access (WCDMA) system, a Long Term Evolution (LTE) system, or a Code Division Multiple Access (CDMA) system, and supported communication is mainly communication for a voice and data. Generally, a connection quantity supported by a conventional base station is limited, and is easy to implement.

Optionally, a network device is a base station, and a terminal device is user equipment.

The embodiments of the present invention are described with reference to the terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may be a station (ST) in a wireless local area network (WLAN); or may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a future 5G network.

In addition, the embodiments of the present invention are described with reference to the network device. The network device may be a device configured to communicate with a mobile device. The network device may be an access point (AP) in a WLAN, or a base transceiver station (BTS) in GSM or CDMA; or may be a NodeB (NB) in WCDMA; or may be an evolved NodeB (eNB or eNodeB) in LTE, a relay node or an access point, an in-vehicle device, a wearable device, or a network device in a future 5G network.

In addition, aspects or features in the embodiments of the present invention may be implemented as a method, an apparatus, or a product that uses standard programming and/or engineering technologies. The term "product" used in this application covers a computer program that can be accessed from any computer readable component, carrier or medium. For example, the computer readable medium may include but is not limited to a magnetic storage component (such as a hard disk, a floppy disk, or a magnetic tape), an optical disc such as a compact disc (CD) or a digital versatile disc (DVD), a smart card, and a flash memory component such as an erasable programmable read-only memory (EPROM). In addition, various storage media described in this specification may indicate one or more devices and/or other machine-readable media that is used to store information. The term "machine readable media" may include but is not limited to a radio channel, and various other media that can store, contain and/or carry an instruction and/or data.

In the embodiments of the present invention, a frequency domain resource used by a communications system may be a spectrum resource that is used by a network device and that is corresponding to a carrier with a specified bandwidth. The carrier may include a plurality of subcarriers, or the carrier may include a plurality of resource blocks (RB).

In addition, in the embodiments of the present invention, a bandwidth of the frequency domain resource may be randomly set according to a system requirement or a protocol rule. This is not specifically limited in the present invention. For example, the bandwidth of the frequency domain resource may be 20 MHz or 100 MHz.

FIG. 1 shows a schematic diagram of an example of a division manner of a frequency domain resource according to an embodiment of the present invention. As shown in FIG. 1, the frequency domain resource (that is, a spectrum resource corresponding to a carrier) may be divided into N frequency domain resource groups (or may be referred to as "wide sub-bands"), that is, a frequency domain resource group #0 to a frequency domain resource group # N−1 shown in FIG. 1, and N≥2.

Each frequency domain resource group includes an RB, or each frequency domain resource group includes at least two subcarriers.

It should be noted that, in this embodiment of the present invention, bandwidths (or quantities of subcarriers or RBs that are included by all the N frequency domain resource groups) of all the N frequency domain resource groups may be the same or different. This is not specifically limited in the present invention.

Optionally, the at least two frequency domain resource groups are continuously distributed in the frequency domain resource.

Specifically, in this embodiment of the present invention, any two adjacent frequency domain resource groups may be continuously configured, or no guard interval may be set between any two adjacent frequency domain resource groups. Therefore, bandwidth utilization can be improved.

It should be understood that, the above-enumerated configuration relationship between frequency domain resource groups is only an example for description. This is not limited in the present invention. For example, a guard interval may be configured between two adjacent frequency domain resource groups in some or all of the N frequency domain resource groups.

Optionally, the at least two frequency domain resource groups are in a one-to-one correspondence with at least two hybrid automatic repeat request HARQ entities, and each HARQ entity is configured to perform HARQ processing for a corresponding frequency domain resource group.

Figure 2:
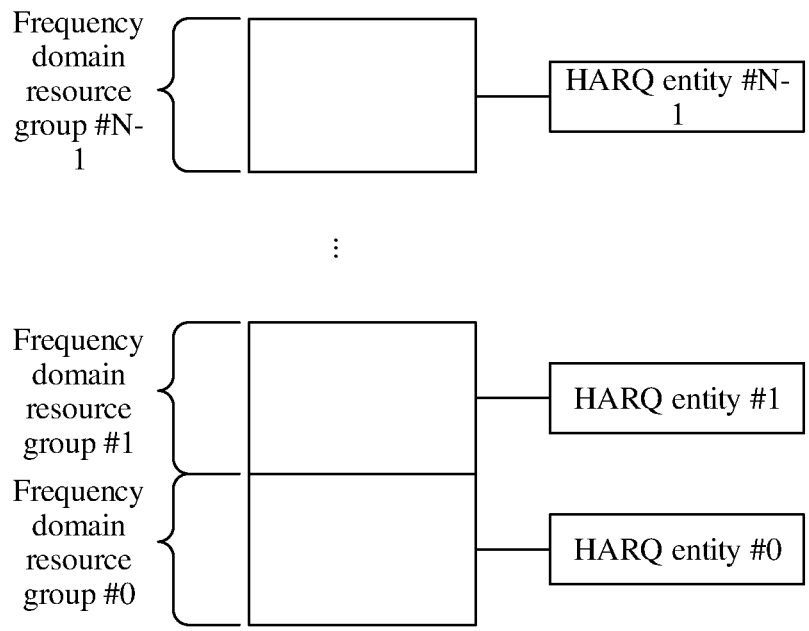
FIG. 2 is a schematic diagram of an example of a configuration manner of a HARQ entity according to an embodiment of the present invention.

Specifically, as shown in FIG. 2, in this embodiment of the present invention, N hybrid automatic repeat request (HARQ) entities may be configured in a network device, and the N HARQ entities are in a one-to-one correspondence with the N frequency domain resource groups, that is, each HARQ entity is configured to perform feedback processing only for transmission (including uplink transmission and downlink transmission) carried in a corresponding frequency domain resource group. Therefore, a transmission error caused because one HARQ entity is configured to process feedback processing for a plurality of frequency domain resource groups can be avoided, and practicability of this embodiment of the present invention can be further improved.

In this embodiment of the present invention, the N frequency domain resource groups may be configured in a primary-secondary manner (that is, a configuration manner 1), or the N frequency domain resource groups may be independently configured (that is, a configuration manner 2). The following separately describes the two configuration manners in detail.

Configuration Manner 1

Optionally, the at least two frequency domain resource groups include a primary frequency domain resource group and at least one secondary frequency domain resource group.

Specifically, because the N frequency domain resource groups belong to a spectrum resource corresponding to a same carrier, the N frequency domain resource groups may belong to a same cell, or cell configuration of cells corresponding to the N frequency domain resource groups may be the same.

Therefore, in this embodiment of the present invention, one (or more) of the N frequency domain resource groups may be set as the primary frequency domain resource group, for example, the frequency domain resource group #0 shown in FIG. 1.

In addition, another frequency domain resource group may be used as the secondary frequency domain resource group.

It should be noted that, in this embodiment of the present invention, the primary frequency domain resource group may be specified in a protocol, or may be determined by the network device and a terminal device (including a target terminal device) by means of negotiation. This is not specifically limited in the present invention.

In addition, in this embodiment of the present invention, the primary frequency domain resource group may be used as a frequency domain resource that is used by the terminal device to initially access the network device.

That is, the network device may deliver indication information of the primary frequency domain resource group to the terminal device by using a preset time-frequency resource that is used to transmit system information such as a master information block (MIB, Master Information Block), for example, information such as a sequence number of the primary frequency domain resource group or a location of the primary frequency domain resource group in the frequency domain resource. Therefore, the terminal device may determine the primary frequency domain resource group, and perform access processing by using the primary frequency domain resource group.

In addition, after access is performed, the network device may further allocate another frequency domain resource group to the terminal device, for example, according to a processing capability (that is, a width of a spectrum resource that can be processed by the terminal device) of the terminal device. For example, a terminal device with a relatively low processing capability may perform communication by using only the primary frequency domain resource group, and a terminal device with a relatively high processing capability may perform communication by using the primary frequency domain resource group and one or more secondary frequency domain resource groups.

Alternatively, after access is performed, the network device may further allocate another frequency domain resource group to the terminal device, for example, according to a service type of a service (or a bandwidth requirement of the service) visited by the terminal device. For example, if the terminal device visits a service having a relatively high bandwidth requirement, the terminal device may perform communication by using only the primary frequency domain resource group. If the terminal device visits a service having a relatively low bandwidth requirement, the terminal device may perform communication by using the primary frequency domain resource group and one or more secondary frequency domain resource groups.

Optionally, a control channel is configured in the primary frequency domain resource group, and the control channel in the primary frequency domain resource group is used to transmit scheduling information of all frequency domain resource groups used in one scheduling period.

Figure 3:
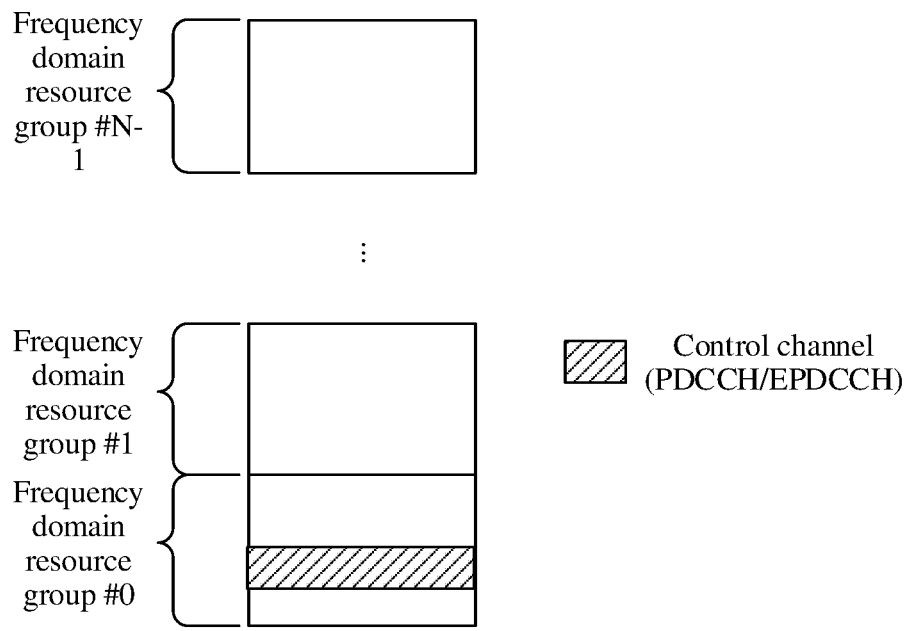
FIG. 3 is a schematic diagram of an example of a configuration manner of a control channel according to an embodiment of the present invention.

Specifically, as shown in FIG. 3, the control channel may be configured only in the frequency domain resource group #0 (that is, an example of the primary frequency domain resource group) instead of the secondary frequency domain resource groups (which, for example, may include the frequency domain resource group #1 to the frequency domain resource group # N−1). In addition, control information such as downlink control information (DCI) of all the second frequency domain resource groups may be transmitted on the control channel in the frequency domain resource group #0.

As an example instead of a limitation, when control information of a plurality of terminal devices needs to be transmitted in one scheduling period by using the control channel in the primary frequency domain resource group, the control information of the plurality of terminal devices may share the control channel in the primary frequency domain resource group in a code division multiplexing manner, a time division multiplexing manner, a frequency division multiplexing manner, or the like.

In addition, in this embodiment of the present invention, when a plurality of frequency domain resource groups (which, for example, may include the primary frequency domain resource group and at least one secondary frequency domain resource group) need to be allocated to one terminal device, the following case exists:

For example, each frequency domain resource group allocated to the terminal device may have independent DCI, and each piece of DCI may include frequency domain resource group indication information (or a frequency domain resource group indicator field) used to indicate a frequency domain resource group scheduled by using the DCI. In addition, each piece of DCI may include TB indication information (or a TB field) used to indicate a quantity of TBs carried in the frequency domain resource group. In addition, each piece of DCI may include resource block indication information (that is, a resource block indicator field) used to indicate a specific resource block that is in the frequency domain resource group and to which each TB is mapped. Herein, all TBs carried in each frequency domain resource group may be carried in a same resource block in the frequency domain resource group, or all TBs carried in each frequency domain resource group may be separately carried in different resource blocks in the frequency domain resource group. This is not specifically limited in the present invention.

Alternatively, all the frequency domain resource groups allocated to the terminal device may share same DCI, that is, optionally, the target frequency domain resource group includes at least two frequency domain resource groups; and that the network device performs wireless communication with the target terminal device by using the target frequency domain resource group includes:

performing resource scheduling on all the frequency domain resource groups in the target frequency domain resource group by using one piece of scheduling information.

In an implementation, all the frequency domain resource groups may have a same resource allocation manner (for example, all the frequency domain resource groups carry a same quantity of TBs, and resource blocks that are used to carry a TB and are in all the frequency domain resource groups also have a same location), so that resource allocation manners (or scheduling manners) of all the frequency domain resource groups are indicated by using one piece of DCI.

That is, optionally, the scheduling information includes indication information used to indicate the frequency domain resource groups included in the target frequency domain resource group.

Specifically, indication information, such as a bitmap (Bitmap), used to indicate a frequency domain resource group that is in all frequency domain resource groups in a current cell and that is allocated to the target terminal device may be configured in the DCI, so that the target terminal device determines, according to the bitmap carried in the DCI, that the frequency domain resource group indicated by the bitmap can be used to transmit information.

Alternatively, a frequency domain resource group identifier may be allocated to each frequency domain resource group in a cell, so that one frequency domain resource group identifier can uniquely indicate one frequency domain resource group in the cell. Therefore, a frequency domain resource group identifier of a frequency domain resource group that is in a current cell and that is allocated to the target terminal device may be carried in the DCI, so that the target terminal device determines, according to the frequency domain resource group identifier carried in the DCI, that the frequency domain resource group indicated by the frequency domain resource group identifier can be used to transmit information.

In another implementation, the DCI may include a plurality of information fragments, and each information fragment is used to indicate a resource allocation manner of a corresponding frequency domain resource group. For example, when a target frequency domain resource group allocated to one terminal device includes M (N≥M≥2) frequency domain resource groups (for example, a frequency domain resource group #1 to a frequency domain resource group # M), the DCI includes M information fragments (for example, an information fragment #1 to an information fragment # M). The information fragment #1 is used to indicate a resource allocation manner of the frequency domain resource group #1. For example, the information fragment #1 may include an identifier of the frequency domain resource group #1, a quantity of TBs carried in the frequency domain resource group #1, and a location of a resource block that is used to carry a TB and is in the frequency domain resource group #1. Similarly, the information fragment # M is used to indicate a resource allocation manner of the frequency domain resource group # M. For example, the information fragment # M may include an identifier of the frequency domain resource group # M, a quantity of TBs carried in the frequency domain resource group # M, and a location of a resource block that is used to carry a TB and is in the frequency domain resource group # M.

That is, optionally, the scheduling information includes at least two information fragments, the at least two information fragments are in a one-to-one correspondence with the at least two frequency domain resource groups included in the target frequency domain resource group, and each information fragment is used to indicate a resource allocation manner of a corresponding frequency domain resource group.

In addition, as an example instead of a limitation, the centralized control channel may be a physical downlink control channel (PDCCH), an enhanced physical downlink control channel (EPDCCH), or the like. This is not specifically limited in the present invention.

The control channel is configured only in the primary frequency domain resource group, and scheduling information of all the frequency domain resource groups (including the primary frequency domain resource group and the secondary frequency domain resource group) is transmitted by using the control channel, so that resource overheads of the control channel can be reduced, and a data throughput of a communications system can be improved.

Optionally, an uplink feedback channel is configured in the primary frequency domain resource group, and the uplink feedback channel in the primary frequency domain resource group is used to transmit feedback information of downlink transmission carried in all frequency domain resource groups that are used in one downlink transmission period.

Figure 4:
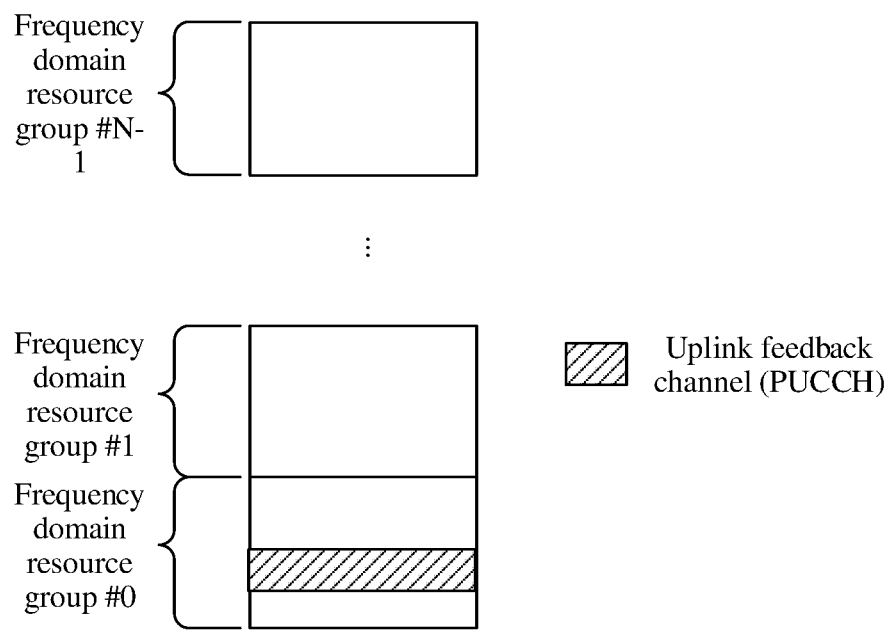
FIG. 4 is a schematic diagram of an example of a configuration manner of an uplink feedback channel according to an embodiment of the present invention.

Specifically, as shown in FIG. 4, the uplink feedback channel may be configured in the primary frequency domain resource group (such as the frequency domain resource group #0) instead of the secondary frequency domain resource groups (such as the frequency domain resource group #1 to the frequency domain resource group # N−1), and feedback information of downlink transmission carried in all the secondary frequency domain resource groups is transmitted on the centralized uplink feedback channel.

In addition, as an example instead of a limitation, the centralized uplink feedback channel may be a physical uplink control channel (PUCCH) or the like. This is not specifically limited in the present invention.

The uplink feedback channel is configured only in the primary frequency domain resource group, and uplink feedback information of all the frequency domain resource groups (including the primary frequency domain resource group and the secondary frequency domain resource group) is transmitted by using the uplink feedback channel, so that resource overheads of the uplink feedback channel can be reduced, and a data throughput of a communications system can be improved.

Optionally, a downlink feedback channel is configured in the primary frequency domain resource group, and the downlink feedback channel in the primary frequency domain resource group is used to transmit feedback information of uplink transmission carried in all frequency domain resource groups that are used in one uplink transmission period.

Figure 5:
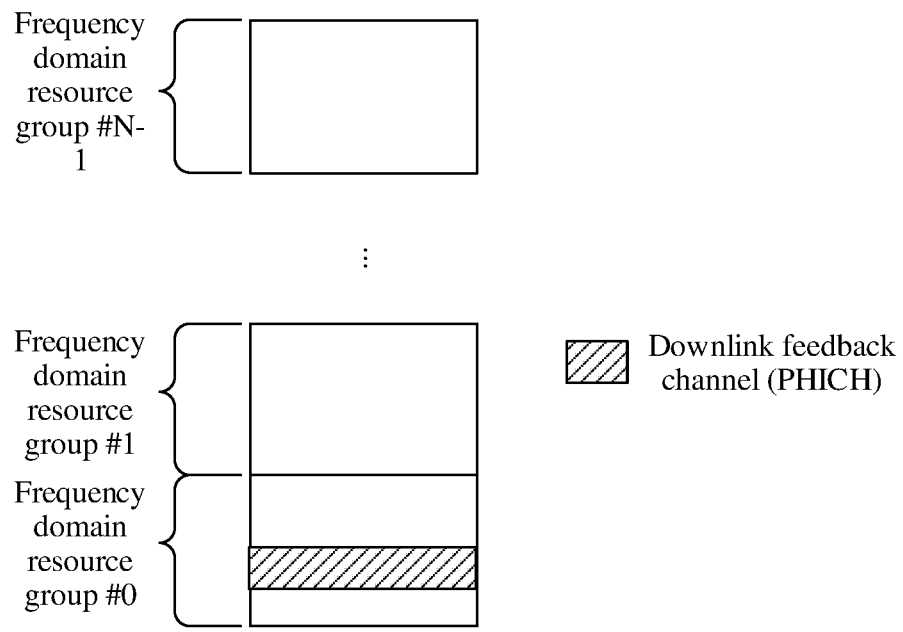
FIG. 5 is a schematic diagram of an example of a configuration manner of a downlink feedback channel according to an embodiment of the present invention.

Specifically, as shown in FIG. 5, the downlink feedback channel may be configured in the primary frequency domain resource group (such as the frequency domain resource group #0) instead of the secondary frequency domain resource groups (such as the frequency domain resource group #1 to the frequency domain resource group # N−1), and feedback information of uplink transmission carried in all the secondary frequency domain resource groups is transmitted on the centralized downlink feedback channel.

In addition, as an example instead of a limitation, the centralized downlink feedback channel may be a physical hybrid automatic repeat request indicator channel (PHICH) or the like. This is not specifically limited in the present invention.

The downlink feedback channel is configured only in the primary frequency domain resource group, and downlink feedback information of all the frequency domain resource groups (including the primary frequency domain resource group and the secondary frequency domain resource group) is transmitted by using the downlink feedback channel, so that resource overheads of the downlink feedback channel can be reduced, and a data throughput of a communications system can be improved.

It should be noted that, when the configuration manner 1 is used, each channel in the primary frequency domain resource group may be detected by all terminal devices in the system that need to perform communication in a current communication period.

Configuration Manner 2

Optionally, a control channel is configured in each frequency domain resource group, and each control channel is used to transmit scheduling information of a frequency domain resource group to which the control channel belongs.

Figure 6:
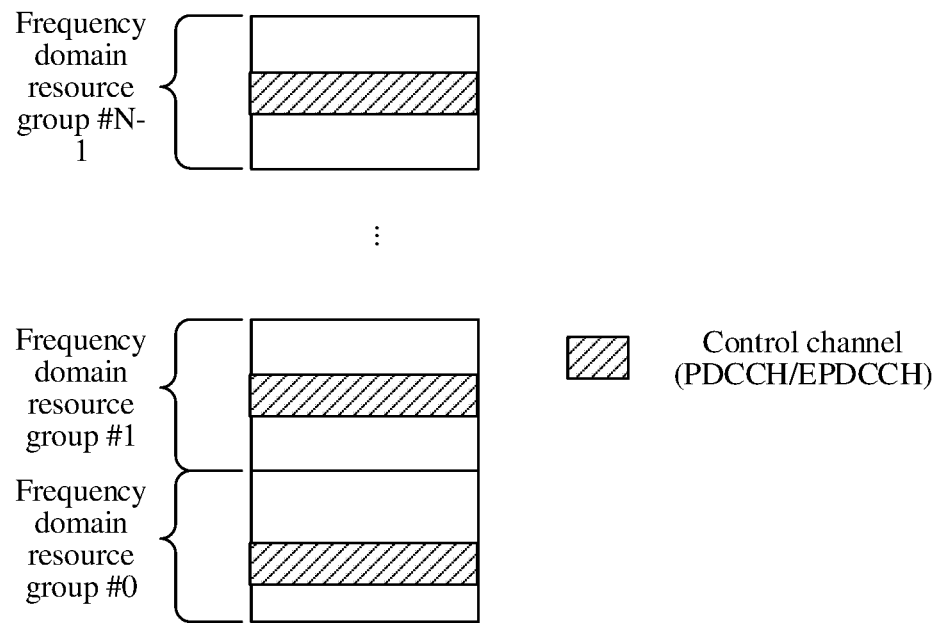
FIG. 6 is a schematic diagram of another example of a configuration manner of a control channel according to an embodiment of the present invention.

Specifically, as shown in FIG. 6, the control channel may be configured in all the frequency domain resource groups (such as the frequency domain resource group #0 to the frequency domain resource group # N−1), and control information such as downlink control information (DCI) of each frequency domain resource group is transmitted on the control channel in each frequency domain resource group.

In addition, as an example instead of a limitation, the control channel may be a physical downlink control channel (PDCCH), an enhanced physical downlink control channel (EPDCCH), or the like. This is not specifically limited in the present invention.

An independent control channel is configured in each frequency domain resource group, so that transmission in each frequency domain resource group can be flexibly controlled, and flexibility of the wireless communication method in embodiments of the present invention can be improved.

Optionally, an uplink feedback channel is configured in each frequency domain resource group, and each uplink feedback channel is used to transmit feedback information of downlink transmission carried in a frequency domain resource group to which the uplink feedback channel belongs.

Figure 7:
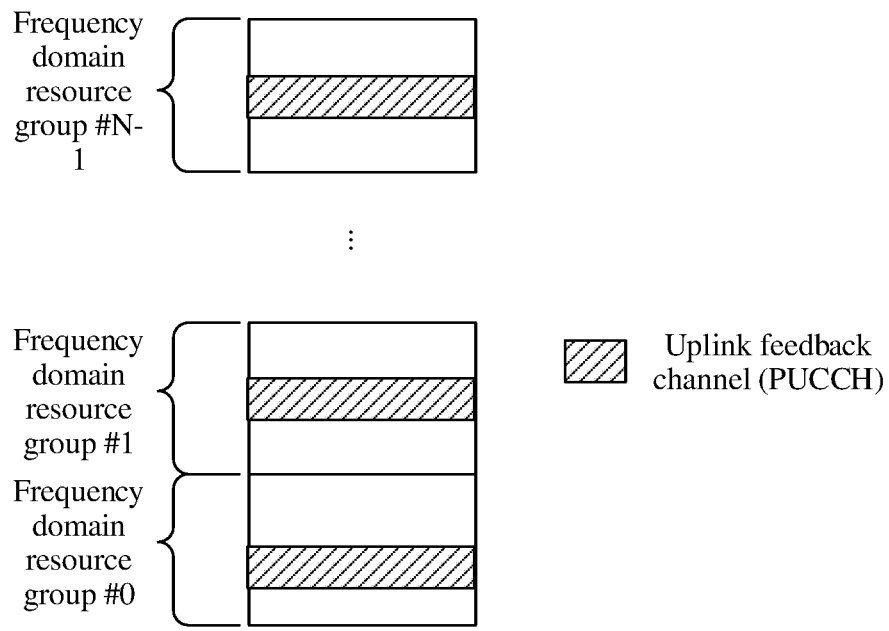
FIG. 7 is a schematic diagram of another example of a configuration manner of an uplink feedback according to an embodiment of the present invention.

Specifically, as shown in FIG. 7, the uplink feedback channel may be configured in all the frequency domain resource groups (such as the frequency domain resource group #0 to the frequency domain resource group # N−1), and feedback information of downlink transmission carried in each frequency domain resource group is transmitted on the uplink feedback channel in each frequency domain resource group.

In addition, as an example instead of a limitation, the uplink feedback channel may be a physical uplink control channel (PUCCH) or the like. This is not specifically limited in the present invention.

An independent uplink feedback channel is configured in each frequency domain resource group, so that feedback can be flexibly performed for each frequency domain resource group, and flexibility of the wireless communication method in embodiments of the present invention can be improved.

Optionally, a downlink feedback channel is configured in each frequency domain resource group, and each downlink feedback channel is used to transmit feedback information of uplink transmission carried in a frequency domain resource group to which the downlink feedback channel belongs.

Figure 8:
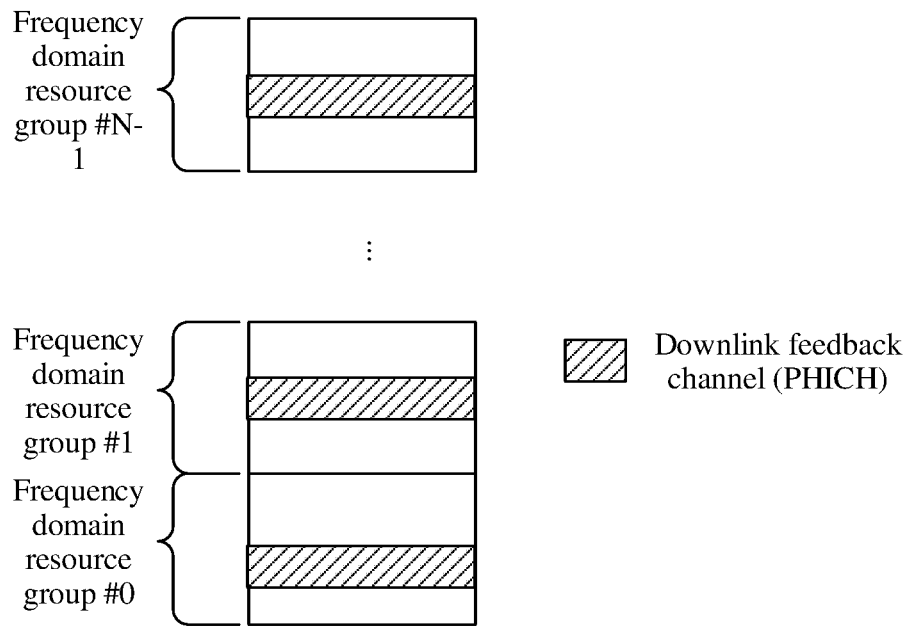
FIG. 8 is a schematic diagram of another example of a configuration manner of a downlink feedback according to an embodiment of the present invention.

Specifically, as shown in FIG. 8, the downlink feedback channel may be configured in all the frequency domain resource groups (such as the frequency domain resource group #0 to the frequency domain resource group # N−1), and feedback information of uplink transmission carried in each frequency domain resource group is transmitted on the downlink feedback channel in each frequency domain resource group.

In addition, as an example instead of a limitation, the downlink feedback channel may be a physical hybrid automatic repeat request indicator channel (PHICH) or the like. This is not specifically limited in the present invention.

An independent downlink feedback channel is configured in each frequency domain resource group, so that feedback can be flexibly performed for each frequency domain resource group, and flexibility of the wireless communication method in embodiments of the present invention can be improved.

It should be noted that, in this embodiment of the present invention, each channel in each frequency domain resource group may be detected only by a terminal device to which the frequency domain resource group is allocated.

It should be understood that, the above-enumerated configuration manner 1 and configuration manner 2 may be separately used or may be used together. This is not specifically limited in the present invention. For example, control information may be transmitted by using a control channel configured in a primary frequency domain resource group, to notify a terminal device of a secondary frequency domain resource group allocated to the terminal device, and control information of each secondary frequency domain resource group is transmitted by using a control channel configured in each secondary frequency domain resource group.

The foregoing describes in detail the division manner of a frequency domain resource in this embodiment of the present invention with reference to FIG. 1 to FIG. 8. The following describes in detail the wireless communication method in the embodiments of the present invention with reference to FIG. 9 to FIG. 11.

FIG. 9 shows a schematic flowchart of a wireless communication method 100 described from a perspective of a network device according to an embodiment of the present invention. The method 100 is applied to a communications system using a frequency domain resource with a specified bandwidth. The frequency domain resource is divided into at least two frequency domain resource groups. Each frequency domain resource group includes at least one resource block. The at least two frequency domain resource groups belong to a same cell. As shown in FIG. 9, the method 100 includes the following steps:

S110. A network device determines, from the at least two frequency domain resource groups, a target frequency domain resource group to be allocated to a target terminal device, where the target frequency domain resource group includes at least one frequency domain resource group.

S120. The network device sends first indication information to the target terminal device, where the first indication information is used to indicate the target frequency domain resource group.

S130. The network device performs wireless communication with the target terminal device by using the target frequency domain resource group.

Specifically, when a terminal device # A (that is, an example of the target terminal device) needs to perform wireless communication with the network device, the network device may allocate a target frequency domain resource group to the terminal device # A. In addition, in this embodiment of the present invention, the target frequency domain resource group may include M frequency domain resource groups obtained by means of division, and M≤N.

As an example instead of a limitation, when the N frequency domain resource groups obtained by means of division include a primary frequency domain resource group, the network device may notify the terminal device # A of a location of the primary frequency domain resource group by using system information (such as a MIB message).

Alternatively, a location of the primary frequency domain resource group may be specified in a protocol.

Therefore, the terminal device can perform access processing by using the primary frequency domain resource group.

It should be understood that, the above-enumerated access processing method is only an example for description. This is not limited in the present invention. For example, the terminal device and the network device may further perform access processing according to a preset time-frequency resource specified in a protocol.

Optionally, that the network device determines, from the at least two frequency domain resource groups, a target frequency domain resource group to be allocated to a target terminal device includes:

receiving, by the network device, terminal capability information sent by the target terminal device, where the terminal capability information is used to indicate a maximum width of a frequency domain resource that can be processed by the target terminal device; and determining, by the network device from the at least two frequency domain resource groups according to the terminal capability information, the target frequency domain resource group to be allocated to the target terminal device.

Specifically, the terminal device # A may, for example, send terminal capability information to the network device by using a time-frequency resource in the primary frequency domain resource group. In this embodiment of the present invention, the terminal capability information may indicate a bandwidth that can be processed by the terminal device # A. Therefore, the network device can allocate the target frequency domain resource group to the terminal device # A based on the terminal capability information.

For example, if the terminal device # A can process a relatively low bandwidth, only a relatively small quantity (for example, one) of frequency domain resource groups may be allocated to the terminal device # A, and used as the target frequency domain resource group. In this case, as an example instead of a limitation, the primary frequency domain resource group may be used as the target frequency domain resource group.

For another example, if the terminal device # A can process a relatively high bandwidth, a plurality of frequency domain resource groups may be allocated to the terminal device # A, and used as the target frequency domain resource group.

Optionally, that the network device determines, from the at least two frequency domain resource groups, a target frequency domain resource group to be allocated to a target terminal device includes:

receiving, by the network device, service type information sent by the target terminal device, where the service type information is used to indicate a maximum width of a frequency domain resource required by a service visited by the target terminal device; and determining, by the network device from the at least two frequency domain resource groups according to the service type information, the target frequency domain resource group to be allocated to the target terminal device.

Specifically, the terminal device # A may, for example, send service type information to the network device by using a time-frequency resource in the primary frequency domain resource group. In this embodiment of the present invention, the service type information may indicate a bandwidth required by a service visited by the terminal device # A. Therefore, the network device can allocate the target frequency domain resource group to the terminal device # A based on the service type information.

For example, if the service visited by the terminal device # A is a conventional service such as a voice service or a short message service, the service requires a relatively low bandwidth, and only a relatively small quantity (for example, one) of frequency domain resource groups may be allocated to the terminal device # A, and used as the target frequency domain resource group. In this case, as an example instead of a limitation, the primary frequency domain resource group may be used as the target frequency domain resource group.

For example, if the service visited by the terminal device # A is a big data service such as a video service or a high-definition image service, a plurality of frequency domain resource groups may be allocated to the terminal device # A, and used as the target frequency domain resource group.

It should be understood that, the foregoing allocation process of the target frequency domain resource group may be performed in the foregoing access process, or may be performed after the access process is completed. This is not specifically limited in the present invention.

Subsequently, the network device may send indication information (that is, the first indication information) of the allocated target frequency domain resource group to the target terminal device.

Optionally, that the network device sends first indication information to the target terminal device includes:

sending, by the network device, the first indication information to the target terminal device by using the primary frequency domain resource group.

Specifically, when the N frequency domain resource groups obtained by means of division include a primary frequency domain resource group, the network device may send the indication information of the target frequency domain resource group to the terminal device # A by using the primary frequency domain resource group (for example, a centralized control channel in the primary frequency domain resource group).

It should be understood that, the above-enumerated sending manner of the indication information of the target frequency domain resource group is only an example for description. This is not limited in the present invention. For example, the indication information of the target frequency domain resource group may be further sent to the terminal device # A by using a MIB message or the like.

After the network device and the terminal device # A determine the target frequency domain resource group by means of negotiation, the network device and the terminal device # A can perform wireless communication by using the target frequency domain resource group.

In this embodiment of the present invention, the network device may send scheduling information to the terminal device # A by using an independent control channel in the target frequency domain resource group or by using the centralized control channel in the primary frequency domain resource group. In addition, the terminal device # A may transmit data according to the scheduling information by using the target frequency domain resource group.

For example, during downlink transmission, the network device may map, to some or all time-frequency resources in the target frequency domain resource group indicated by the scheduling information, a transport block (TB) that needs to be sent to the terminal device # A, so as to send the TB to the terminal device # A by using the target frequency domain resource group.

For another example, during uplink transmission, the terminal device # A may map, to some or all time-frequency resources in the target frequency domain resource group indicated by the scheduling information, a TB that needs to be sent to the network device, so as to send the TB to the network device by using the target frequency domain resource group.

The following describes in detail a TB mapping manner in the target frequency domain resource group.

In this embodiment of the present invention, at least one TB may be mapped to each frequency domain resource group. TBs mapped to all the frequency domain resource groups may be the same or different. This is not specifically limited in the present invention.

Optionally, the target frequency domain resource group includes at least two frequency domain resource groups; and that the network device performs wireless communication with the target terminal device by using the target frequency domain resource group includes:

transmitting, by the network device, at least two transport blocks TBs to the target terminal device by using the target frequency domain resource group, where a first TB in the at least two TBs is carried in a first frequency domain resource group in the target frequency domain resource group, a second TB in the at least two TBs is carried in a second frequency domain resource group in the target frequency domain resource group, and the first frequency domain resource group is different from the second frequency domain resource group.

Specifically, in this embodiment of the present invention, when the terminal device # A needs to transmit (for example, send or receive) two or more TBs, these TBs may be separately carried in (or mapped to) different frequency domain resource groups.

For example, each frequency domain resource group in the target frequency domain resource group may carry one TB. That is, if the terminal device # A needs to transmit N TBs, N frequency domain resource groups (for example, a frequency domain resource group #0 to a frequency domain resource group # N−1) may be allocated to the terminal device # A, and used as the target frequency domain resource group. In addition, the N TBs are in a one-to-one correspondence with the N frequency domain resource groups, that is, each frequency domain resource group carries a corresponding TB.

Alternatively, some frequency domain resource groups in the target frequency domain resource group may each carry one TB, and the other frequency domain resource groups may each carry two (or more than two) TBs.

Optionally, that the network device performs wireless communication with the target terminal device by using the target frequency domain resource group includes:

transmitting, by the network device, at least three transport blocks TBs to the target terminal device by using the target frequency domain resource group.

The target frequency domain resource group includes at least two frequency domain resource groups, and at least one frequency domain resource group in the target frequency domain resource is used to carry at least two TBs; or the target frequency domain resource group includes at least three frequency domain resource groups, and each frequency domain resource group in the target frequency domain resource group is used to carry at least one TB.

Specifically, when the target frequency domain resource group includes at least three frequency domain resource groups, one TB may be mapped to each frequency domain resource group included in the target frequency domain resource group. For example, as shown in FIG. 10, when a quantity of TBs that need to be sent by a transmit-end device (that is, either the network device or the terminal device # A) may be, for example, 4, and a quantity of frequency domain resource groups included in the target frequency domain resource group is, for example, 4, a TB #1 may be mapped to a frequency domain resource group #1, a TB #2 may be mapped to a frequency domain resource group #2, a TB #3 may be mapped to a frequency domain resource group #3, a TB #4 may be mapped to a frequency domain resource group #4.

Alternatively, when the target frequency domain resource group includes at least two frequency domain resource groups, two or more TBs may be mapped to each of one or more frequency domain resource groups included in the target frequency domain resource group. In addition, one TB may be mapped to each of the other frequency domain resource groups included in the target frequency domain resource group.

Alternatively, when the target frequency domain resource group includes at least two frequency domain resource groups, two or more TBs may be mapped to each frequency domain resource group included in the target frequency domain resource group.

In the prior art, a maximum of two TBs of one terminal device can be transmitted by using one carrier in one transmission period. In comparison with the prior art, in this embodiment of the present invention, at least two frequency domain resource groups on one carrier are allocated to one terminal device, so that at least three TBs of the terminal device # A can be transmitted in one transmission period. Therefore, according to the wireless communication method in this embodiment of the present invention, a data transmission time of an individual terminal device can be shortened.

In addition, in the prior art, when two TBs of one terminal device are transmitted by using one carrier, a same frequency domain resource on the carrier is multiplexed for the two TBs by using a technology such as space division multiplexing. In comparison with the prior art, in this embodiment of the present invention, at least two frequency domain resource groups on one carrier are allocated to one terminal device, so that different TBs can be transmitted by using different frequency domain resource groups, and there is no need to use the technology such as space division multiplexing. Therefore, a processing requirement and load of the network device and that of the terminal device can be reduced.

It should be understood that, the above-enumerated mapping manner is only an example for description. This is not limited in the present invention. A quantity of frequency domain resource groups included in the target frequency domain resource group may be randomly set, and a TB quantity of the terminal device # A may be also randomly set. This is not specifically limited in the present invention.

Optionally, that the network device performs wireless communication with the target terminal device by using the target frequency domain resource group includes:

sending, by the network device, scheduling information of the target frequency domain resource group to the target terminal device by using a control channel in the primary frequency domain resource group.

Specifically, in this embodiment of the present invention, the network device may send the scheduling information (such as DCI) of the target frequency domain resource group to the terminal device # A by using the control channel configured in the primary frequency domain resource group. Correspondingly, the terminal device # A may receive the scheduling information of the target frequency domain resource group on the control channel in the primary frequency domain resource group, and transmit a TB based on the scheduling information and by using the target frequency domain resource group.

Optionally, that the network device performs wireless communication with the target terminal device by using the target frequency domain resource group includes:

sending, by the network device, the scheduling information of the target frequency domain resource group to the target terminal device by using a control channel in the target frequency domain resource group.

Specifically, in this embodiment of the present invention, the network device may send scheduling information (such as DCI) of each frequency domain resource group in the target frequency domain resource to the terminal device # A by using a control channel configured in each frequency domain resource group in the target frequency domain resource group. Correspondingly, the terminal device # A may receive the scheduling information of each frequency domain resource group in the target frequency domain resource on the control channel in each frequency domain resource group in the target frequency domain resource, and transmit a TB based on the scheduling information and by using each frequency domain resource group.

Optionally, that the network device performs wireless communication with the target terminal device by using the target frequency domain resource group includes:

receiving, by the network device by using an uplink feedback channel in the primary frequency domain resource group, feedback information that is sent by the target terminal device and that is of downlink transmission carried in the target frequency domain resource group.

Specifically, in this embodiment of the present invention, the terminal device # A may send, to the network device by using the uplink feedback channel (such as a PUCCH) configured in the primary frequency domain resource group, feedback information (such as feedback information of a downlink HARQ) of downlink transmission carried in each frequency domain resource group in the target frequency domain resource group. Correspondingly, the network device may receive, on the uplink feedback channel in the primary frequency domain resource group, the feedback information of the downlink transmission carried in each frequency domain resource group in the target frequency domain resource group, and perform HARQ processing based on the feedback information.

Optionally, that the network device performs wireless communication with the target terminal device by using the target frequency domain resource group includes:

receiving, by the network device by using an uplink feedback channel in the target frequency domain resource group, the feedback information that is sent by the target terminal device and that is of the downlink transmission carried in the target frequency domain resource group.

Specifically, in this embodiment of the present invention, the terminal device # A may send, to the network device by using an uplink feedback channel (such as a PUCCH) configured in each frequency domain resource group in the target frequency domain resource group, the feedback information (such as feedback information of a downlink HARQ) of the downlink transmission carried in each frequency domain resource group in the target frequency domain resource group. Correspondingly, the network device may receive, on the uplink feedback channel in each frequency domain resource group in the target frequency domain resource group, the feedback information of the downlink transmission carried in each frequency domain resource group in the target frequency domain resource group, and perform HARQ processing based on the feedback information.

Optionally, that the network device performs wireless communication with the target terminal device by using the target frequency domain resource group includes:

sending, by the network device to the target terminal device by using a downlink feedback channel in the primary frequency domain resource group, feedback information of uplink transmission carried in the target frequency domain resource group.

Specifically, in this embodiment of the present invention, the network device may send, to the terminal device # A by using the downlink feedback channel (such as a PHICH) configured in the primary frequency domain resource group, feedback information (such as feedback information of an uplink HARQ) of uplink transmission carried in each frequency domain resource group in the target frequency domain resource group. Correspondingly, the terminal device # A may receive, on the downlink feedback channel in the primary frequency domain resource group, the feedback information of the uplink transmission carried in each frequency domain resource group in the target frequency domain resource group, and perform HARQ processing based on the feedback information.

Optionally, that the network device performs wireless communication with the target terminal device by using the target frequency domain resource group includes:

sending, by the network device to the target terminal device by using a downlink feedback channel in the target frequency domain resource group, the feedback information of the uplink transmission carried in the target frequency domain resource group.

Specifically, in this embodiment of the present invention, the network device may send, to the terminal device # A by using a downlink feedback channel (such as a PHICH) configured in each frequency domain resource group in the target frequency domain resource group, the feedback information (such as feedback information of an uplink HARQ) of the downlink transmission carried in each frequency domain resource group in the target frequency domain resource group. Correspondingly, the terminal device # A may receive, on the downlink feedback channel in each frequency domain resource group in the target frequency domain resource group, the feedback information of the uplink transmission carried in each frequency domain resource group in the target frequency domain resource group, and perform HARQ processing based on the feedback information.

According to the wireless communication method in this embodiment of the present invention, a frequency domain resource provided by a system is divided into at least two frequency domain resource groups, and when a terminal device needs to perform wireless communication, one or more frequency domain resource groups may be allocated to the terminal device from the at least two frequency domain resource groups, to support the terminal device in performing wireless communication, so that a corresponding frequency domain resource can be provided to the terminal device based on a requirement of the terminal device. Therefore, different user requirements can be flexibly met.

FIG. 11 shows a schematic flowchart of a communication method 200 described from a perspective of a terminal device according to an embodiment of the present invention. The method 200 is applied to a communications system using a frequency domain resource with a specified bandwidth. The frequency domain resource is divided into at least two frequency domain resource groups. Each frequency domain resource group includes at least one resource block. The at least two frequency domain resource groups belong to a same cell. As shown in FIG. 11, the method 200 includes the following steps:

S210. A target terminal device receives first indication information sent by a network device, where the first indication information is used to indicate a target frequency domain resource group, the target frequency domain resource group is determined by the network device from the at least two frequency domain resource groups, and the target frequency domain resource group includes at least one frequency domain resource group.

S220. The target terminal device performs wireless communication with the network device by using the target frequency domain resource group.

Optionally, the target frequency domain resource group includes at least two frequency domain resource groups; and that the target terminal device performs wireless communication with the network device by using the target frequency domain resource group includes:

transmitting, by the target terminal device, at least two transport blocks TBs to the network device by using the target frequency domain resource group, where a first TB in the at least two TBs is carried in a first frequency domain resource group in the target frequency domain resource group, a second TB in the at least two TBs is carried in a second frequency domain resource group in the target frequency domain resource group, and the first frequency domain resource group is different from the second frequency domain resource group.

Optionally, the method further includes:

sending, by the target terminal device, terminal capability information to the network device, where the terminal capability information is used to indicate a maximum width of a frequency domain resource that can be processed by the target terminal device, so that the network device determines the target frequency domain resource group according to the terminal capability information.

Optionally, the at least two frequency domain resource groups are continuously distributed in the frequency domain resource.

Optionally, the at least two frequency domain resource groups include a primary frequency domain resource group and at least one secondary frequency domain resource group.

Optionally, that a target terminal device receives first indication information sent by a network device includes:

receiving, by the target terminal device by using the primary frequency domain resource group, the first indication information sent by the network device.

Optionally, a control channel is configured in the primary frequency domain resource group, and the control channel in the primary frequency domain resource group is used to transmit scheduling information of all frequency domain resource groups used in one scheduling period; and that the target terminal device performs wireless communication with the network device by using the target frequency domain resource group includes:

receiving, by the target terminal device by using the control channel in the primary frequency domain resource group, scheduling information that is sent by the network device and that is of the target frequency domain resource group.

Optionally, a control channel is configured in each frequency domain resource group, and each control channel is used to transmit scheduling information of a frequency domain resource group to which the control channel belongs; and that the target terminal device performs wireless communication with the network device by using the target frequency domain resource group includes:

receiving, by the target terminal device by using a control channel in the target frequency domain resource group, the scheduling information that is sent by the network device and that is of the target frequency domain resource group.

Optionally, an uplink feedback channel is configured in the primary frequency domain resource group, and the uplink feedback channel in the primary frequency domain resource group is used to transmit feedback information of downlink transmission carried in all frequency domain resource groups that are used in one downlink transmission period; and that the target terminal device performs wireless communication with the network device by using the target frequency domain resource group includes:

sending, by the target terminal device to the network device by using the uplink feedback channel in the primary frequency domain resource group, feedback information of downlink transmission carried in the target frequency domain resource group.

Optionally, an uplink feedback channel is configured in each frequency domain resource group, and each uplink feedback channel is used to transmit feedback information of downlink transmission carried in a frequency domain resource group to which the uplink feedback channel belongs; and that the target terminal device performs wireless communication with the network device by using the target frequency domain resource group includes:

sending, by the target terminal device to the network device by using an uplink feedback channel in the target frequency domain resource group, the feedback information of the downlink transmission carried in the target frequency domain resource group.

Optionally, a downlink feedback channel is configured in the primary frequency domain resource group, and the downlink feedback channel in the primary frequency domain resource group is used to transmit feedback information of uplink transmission carried in all frequency domain resource groups that are used in one uplink transmission period; and that the target terminal device performs wireless communication with the network device by using the target frequency domain resource group includes:

receiving, by the target terminal device by using the downlink feedback channel in the primary frequency domain resource group, feedback information that is sent by the network device and that is of uplink transmission carried in the target frequency domain resource group.

Optionally, a downlink feedback channel is configured in each frequency domain resource group, and each downlink feedback channel is used to transmit feedback information of uplink transmission carried in a frequency domain resource group to which the downlink feedback channel belongs; and that the target terminal device performs wireless communication with the network device by using the target frequency domain resource group includes:

receiving, by the target terminal device by using a downlink feedback channel in the target frequency domain resource group, the feedback information that is sent by the network device and that is of the uplink transmission carried in the target frequency domain resource group.

Actions of the terminal device in the method 200 are similar to actions of the terminal device in the method 100, and actions of the network device in the method 200 are similar to actions of the network device in the method 100. Herein, to avoid repetition, detailed descriptions thereof are omitted.

According to the wireless communication method in this embodiment of the present invention, a frequency domain resource provided by a system is divided into at least two frequency domain resource groups, and when a terminal device needs to perform wireless communication, one or more frequency domain resource groups may be allocated to the terminal device from the at least two frequency domain resource groups, to support the terminal device in performing wireless communication, so that a corresponding frequency domain resource can be provided to the terminal device based on a requirement of the terminal device. Therefore, different user requirements can be flexibly met.

The foregoing describes in detail the wireless communication method according to the embodiments of the present invention with reference to FIG. 1 to FIG. 11. The following describes in detail a wireless communications apparatus according to the embodiments of the present invention with reference to FIG. 12 and FIG. 13.

FIG. 12 shows a schematic block diagram of a wireless communications apparatus 300 according to an embodiment of the present invention. The apparatus 300 is applied to a communications system using a frequency domain resource with a specified bandwidth. The frequency domain resource is divided into at least two frequency domain resource groups. Each frequency domain resource group includes at least one resource block. The at least two frequency domain resource groups belong to a same cell. As shown in FIG. 12, the apparatus 300 includes:

a determining unit 310, configured to determine, from the at least two frequency domain resource groups, a target frequency domain resource group to be allocated to a target terminal device, where the target frequency domain resource group includes at least one frequency domain resource group; and a communications unit 320, configured to send first indication information to the target terminal device, where the first indication information is used to indicate the target frequency domain resource group.

The communications unit 310 is further configured to perform wireless communication with the target terminal device by using the target frequency domain resource group.

Optionally, the target frequency domain resource group includes at least two frequency domain resource groups; and the communications unit is specifically configured to transmit at least two transport blocks TBs to the target terminal device by using the target frequency domain resource group, where a first TB in the at least two TBs is carried in a first frequency domain resource group in the target frequency domain resource group, a second TB in the at least two TBs is carried in a second frequency domain resource group in the target frequency domain resource group, and the first frequency domain resource group is different from the second frequency domain resource group.

Optionally, the communications unit is further configured to receive terminal capability information sent by the target terminal device. The terminal capability information is used to indicate a maximum width of a frequency domain resource that can be processed by the target terminal device.

The determining unit is specifically configured to determine, from the at least two frequency domain resource groups according to the terminal capability information, the target frequency domain resource group to be allocated to the target terminal device.

Optionally, the at least two frequency domain resource groups are continuously distributed in the frequency domain resource.

Optionally, the at least two frequency domain resource groups include a primary frequency domain resource group and at least one secondary frequency domain resource group.

Optionally, the communications unit is specifically configured to send the first indication information to the target terminal device by using the primary frequency domain resource group.

Optionally, a control channel is configured in the primary frequency domain resource group, and the control channel in the primary frequency domain resource group is used to transmit scheduling information of all frequency domain resource groups used in one scheduling period; and the communications unit is configured to send scheduling information of the target frequency domain resource group to the target terminal device by using the control channel in the primary frequency domain resource group.

Optionally, a control channel is configured in each frequency domain resource group, and each control channel is used to transmit scheduling information of a frequency domain resource group to which the control channel belongs; and the communications unit is configured to send the scheduling information of the target frequency domain resource group to the target terminal device by using a control channel in the target frequency domain resource group.

Optionally, an uplink feedback channel is configured in the primary frequency domain resource group, and the uplink feedback channel in the primary frequency domain resource group is used to transmit feedback information of downlink transmission carried in all frequency domain resource groups that are used in one downlink transmission period; and the communications unit is configured to receive, by using the uplink feedback channel in the primary frequency domain resource group, feedback information that is sent by the target terminal device and that is of downlink transmission carried in the target frequency domain resource group.

Optionally, an uplink feedback channel is configured in each frequency domain resource group, and each uplink feedback channel is used to transmit feedback information of downlink transmission carried in a frequency domain resource group to which the uplink feedback channel belongs; and the communications unit is configured to receive, by using an uplink feedback channel in the target frequency domain resource group, the feedback information that is sent by the target terminal device and that is of the downlink transmission carried in the target frequency domain resource group.

Optionally, a downlink feedback channel is configured in the primary frequency domain resource group, and the downlink feedback channel in the primary frequency domain resource group is used to transmit feedback information of uplink transmission carried in all frequency domain resource groups that are used in one uplink transmission period; and the communications unit is configured to send, to the target terminal device by using the downlink feedback channel in the primary frequency domain resource group, feedback information of uplink transmission carried in the target frequency domain resource group.

Optionally, a downlink feedback channel is configured in each frequency domain resource group, and each downlink feedback channel is used to transmit feedback information of uplink transmission carried in a frequency domain resource group to which the downlink feedback channel belongs; and the communications unit is configured to send, to the target terminal device by using a downlink feedback channel in the target frequency domain resource group, the feedback information of the uplink transmission carried in the target frequency domain resource group.

Optionally, the at least two frequency domain resource groups are in a one-to-one correspondence with at least two hybrid automatic repeat request HARQ entities, and each HARQ entity is configured to perform HARQ processing for a corresponding frequency domain resource group;

the determining unit is further configured to determine a HARQ entity corresponding to the target frequency domain resource group; and the communications unit is configured to perform, according to the HARQ entity corresponding to the target frequency domain resource group, HARQ processing for transmission carried in the target frequency domain resource group.

The wireless communications apparatus 300 according to this embodiment of the present invention may be corresponding to the network device in the method in the embodiments of the present invention. In addition, units and modules in the wireless communications apparatus 300 and the foregoing other operations and/or functions are separately intended to implement a corresponding procedure of the method 100 in FIG. 9. For brevity, details are not described herein.

According to the wireless communications apparatus in this embodiment of the present invention, a frequency domain resource provided by a system is divided into at least two frequency domain resource groups, and when a terminal device needs to perform wireless communication, one or more frequency domain resource groups may be allocated to the terminal device from the at least two frequency domain resource groups, to support the terminal device in performing wireless communication, so that a corresponding frequency domain resource can be provided to the terminal device based on a requirement of the terminal device. Therefore, different user requirements can be flexibly met.

FIG. 13 shows a schematic block diagram of a wireless communications apparatus 400 according to an embodiment of the present invention. The apparatus 400 is applied to a communications system using a frequency domain resource with a specified bandwidth. The frequency domain resource is divided into at least two frequency domain resource groups. Each frequency domain resource group includes at least one resource block. The at least two frequency domain resource groups belong to a same cell. As shown in FIG. 13, the apparatus 400 includes:

a communications unit 410, configured to receive first indication information sent by a network device, where the first indication information is used to indicate a target frequency domain resource group, the target frequency domain resource group is determined by the network device from the at least two frequency domain resource groups, and the target frequency domain resource group includes at least one frequency domain resource group; and a determining unit 420, configured to determine the target frequency domain resource group according to the first indication information.

The communications unit 410 is further configured to perform wireless communication with the network device by using the target frequency domain resource group.

Optionally, the target frequency domain resource group includes at least two frequency domain resource groups; and the communications unit is configured to transmit at least two transport blocks TBs to the network device by using the target frequency domain resource group, where a first TB in the at least two TBs is carried in a first frequency domain resource group in the target frequency domain resource group, a second TB in the at least two TBs is carried in a second frequency domain resource group in the target frequency domain resource group, and the first frequency domain resource group is different from the second frequency domain resource group.

Optionally, the communications unit is further configured to send terminal capability information to the network device. The terminal capability information is used to indicate a maximum width of a frequency domain resource that can be processed by the wireless communications apparatus 400, so that the network device determines the target frequency domain resource group according to the terminal capability information.

Optionally, the at least two frequency domain resource groups are continuously distributed in the frequency domain resource.

Optionally, the at least two frequency domain resource groups include a primary frequency domain resource group and at least one secondary frequency domain resource group.

Optionally, the communications unit is configured to receive, by using the primary frequency domain resource group, the first indication information sent by the network device.

Optionally, a control channel is configured in the primary frequency domain resource group, and the control channel in the primary frequency domain resource group is used to transmit scheduling information of all frequency domain resource groups used in one scheduling period;

and the communications unit is configured to receive, by using the control channel in the primary frequency domain resource group, scheduling information that is sent by the network device and that is of the target frequency domain resource group.

Optionally, a control channel is configured in each frequency domain resource group, and each control channel is used to transmit scheduling information of a frequency domain resource group to which the control channel belongs; and the communications unit is configured to receive, by using a control channel in the target frequency domain resource group, the scheduling information that is sent by the network device and that is of the target frequency domain resource group.

Optionally, an uplink feedback channel is configured in the primary frequency domain resource group, and the uplink feedback channel in the primary frequency domain resource group is used to transmit feedback information of downlink transmission carried in all frequency domain resource groups that are used in one downlink transmission period; and the communications unit is configured to send, to the network device by using the uplink feedback channel in the primary frequency domain resource group, feedback information of downlink transmission carried in the target frequency domain resource group.

Optionally, an uplink feedback channel is configured in each frequency domain resource group, and each uplink feedback channel is used to transmit feedback information of downlink transmission carried in a frequency domain resource group to which the uplink feedback channel belongs; and the communications unit is configured to send, to the network device by using an uplink feedback channel in the target frequency domain resource group, the feedback information of the downlink transmission carried in the target frequency domain resource group.

Optionally, a downlink feedback channel is configured in the primary frequency domain resource group, and the downlink feedback channel in the primary frequency domain resource group is used to transmit feedback information of uplink transmission carried in all frequency domain resource groups that are used in one uplink transmission period; and the communications unit is configured to receive, by using the downlink feedback channel in the primary frequency domain resource group, feedback information that is sent by the network device and that is of uplink transmission carried in the target frequency domain resource group.

Optionally, a downlink feedback channel is configured in each frequency domain resource group, and each downlink feedback channel is used to transmit feedback information of uplink transmission carried in a frequency domain resource group to which the downlink feedback channel belongs; and the communications unit is configured to receive, by using a downlink feedback channel in the target frequency domain resource group, the feedback information that is sent by the network device and that is of the uplink transmission carried in the target frequency domain resource group.

The wireless communications apparatus 400 according to this embodiment of the present invention may be corresponding to the target terminal device (such as the terminal device # A) in the method in the embodiments of the present invention. In addition, units and modules in the wireless communications apparatus 400 and the foregoing other operations and/or functions are separately intended to implement a corresponding procedure of the method 200 in FIG. 11. For brevity, details are not described herein.

According to the wireless communications apparatus in this embodiment of the present invention, a frequency domain resource provided by a system is divided into at least two frequency domain resource groups, and when a terminal device needs to perform wireless communication, one or more frequency domain resource groups may be allocated to the terminal device from the at least two frequency domain resource groups, to support the terminal device in performing wireless communication, so that a corresponding frequency domain resource can be provided to the terminal device based on a requirement of the terminal device. Therefore, different user requirements can be flexibly met.

The foregoing describes in detail the wireless communication method according to the embodiments of the present invention with reference to FIG. 1 to FIG. 11. The following describes in detail a wireless communications device according to the embodiments of the present invention with reference to FIG. 14 and FIG. 15.

Figure 14:
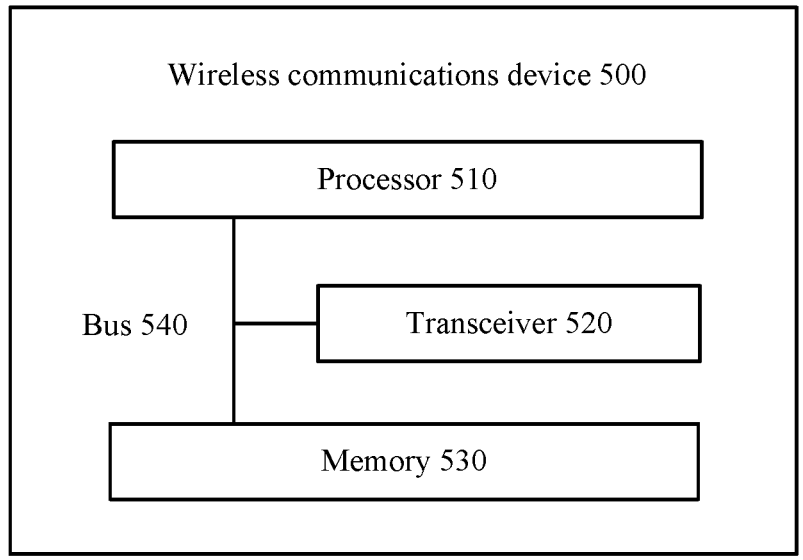
FIG. 14 is a schematic structural diagram of a wireless communications device according to an embodiment of the present invention.

FIG. 14 shows a schematic block diagram of a wireless communications device 500 according to an embodiment of the present invention. As shown in FIG. 14, the device 500 includes a processor 510 and a transceiver 520, and the processor 510 is connected to the transceiver 520. Optionally, the device 500 further includes a memory 530, and the memory 530 is connected to the processor 510. Optionally, the device 500 further includes a bus system 540. The processor 510, the memory 530, and the transceiver 520 may be connected by using the bus system 540. The memory 530 may be configured to store an instruction. The processor 510 is configured to execute the instruction stored in the memory 530, to control the transceiver 520 to send information or a signal. The device 500 is applied to a communications system using a frequency domain resource with a specified bandwidth. The frequency domain resource is divided into at least two frequency domain resource groups. Each frequency domain resource group includes at least one resource block. The at least two frequency domain resource groups belong to a same cell.

The processor 510 executes the instruction to determine, from the at least two frequency domain resource groups, a target frequency domain resource group to be allocated to a target terminal device. The target frequency domain resource group includes at least one frequency domain resource group.

The processor 510 is further configured to control the transceiver 520 to send first indication information to the target terminal device. The first indication information is used to indicate the target frequency domain resource group.

The processor 510 is further configured to control the transceiver 520 to perform wireless communication with the target terminal device by using the target frequency domain resource group.

Optionally, the target frequency domain resource group includes at least two frequency domain resource groups; and the processor 510 is configured to control the transceiver 520 to transmit at least two transport blocks TBs to the target terminal device by using the target frequency domain resource group, where a first TB in the at least two TBs is carried in a first frequency domain resource group in the target frequency domain resource group, a second TB in the at least two TBs is carried in a second frequency domain resource group in the target frequency domain resource group, and the first frequency domain resource group is different from the second frequency domain resource group.

Optionally, the processor 510 is configured to control the transceiver 520 to receive terminal capability information sent by the target terminal device. The terminal capability information is used to indicate a maximum width of a frequency domain resource that can be processed by the target terminal device.

The processor 510 is configured to determine, from the at least two frequency domain resource groups according to the terminal capability information, the target frequency domain resource group to be allocated to the target terminal device.

Optionally, the at least two frequency domain resource groups are continuously distributed in the frequency domain resource.

Optionally, the at least two frequency domain resource groups include a primary frequency domain resource group and at least one secondary frequency domain resource group.

Optionally, the processor 510 is configured to control the transceiver 520 to send the first indication information to the target terminal device by using the primary frequency domain resource group.

Optionally, a control channel is configured in the primary frequency domain resource group, and the control channel in the primary frequency domain resource group is used to transmit scheduling information of all frequency domain resource groups used in one scheduling period;

and the processor 510 is configured to control the transceiver 520 to send scheduling information of the target frequency domain resource group to the target terminal device by using the control channel in the primary frequency domain resource group.

Optionally, a control channel is configured in each frequency domain resource group, and each control channel is used to transmit scheduling information of a frequency domain resource group to which the control channel belongs; and the processor 510 is configured to control the transceiver 520 to send the scheduling information of the target frequency domain resource group to the target terminal device by using a control channel in the target frequency domain resource group.

Optionally, an uplink feedback channel is configured in the primary frequency domain resource group, and the uplink feedback channel in the primary frequency domain resource group is used to transmit feedback information of downlink transmission carried in all frequency domain resource groups that are used in one downlink transmission period; and the processor 510 is configured to control the transceiver 520 to receive, by using the uplink feedback channel in the primary frequency domain resource group, feedback information that is sent by the target terminal device and that is of downlink transmission carried in the target frequency domain resource group.

Optionally, an uplink feedback channel is configured in each frequency domain resource group, and each uplink feedback channel is used to transmit feedback information of downlink transmission carried in a frequency domain resource group to which the uplink feedback channel belongs; and the processor 510 is configured to control the transceiver 520 to receive, by using an uplink feedback channel in the target frequency domain resource group, the feedback information that is sent by the target terminal device and that is of the downlink transmission carried in the target frequency domain resource group.

Optionally, a downlink feedback channel is configured in the primary frequency domain resource group, and the downlink feedback channel in the primary frequency domain resource group is used to transmit feedback information of uplink transmission carried in all frequency domain resource groups that are used in one uplink transmission period; and the processor 510 is configured to control the transceiver 520 to send, to the target terminal device by using the downlink feedback channel in the primary frequency domain resource group, feedback information of uplink transmission carried in the target frequency domain resource group.

Optionally, a downlink feedback channel is configured in each frequency domain resource group, and each downlink feedback channel is used to transmit feedback information of uplink transmission carried in a frequency domain resource group to which the downlink feedback channel belongs; and the processor 510 is configured to control the transceiver 520 to send, to the target terminal device by using a downlink feedback channel in the target frequency domain resource group, the feedback information of the uplink transmission carried in the target frequency domain resource group.

Optionally, the at least two frequency domain resource groups are in a one-to-one correspondence with at least two hybrid automatic repeat request HARQ entities, and each HARQ entity is configured to perform HARQ processing for a corresponding frequency domain resource group;

the processor 510 is further configured to determine a HARQ entity corresponding to the target frequency domain resource group; and the processor 510 is further configured to perform, according to the HARQ entity corresponding to the target frequency domain resource group, HARQ processing for transmission carried in the target frequency domain resource group.

It should be understood that, in this embodiment of the present invention, the processor 510 may be a central processing unit ("CPU"), or the processor 510 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

The memory 530 may include a read-only memory and a random access memory, and provide an instruction and data to the processor 510. A part of the memory 530 may further include a nonvolatile random access memory. For example, the memory 530 may further store information about a device type.

In addition to a data bus, the bus system 540 may further include a power bus, a control bus, a status signal bus, and the like. However, for clarity of description, various buses are marked as the bus system 540 in the figure.

In an implementation process, steps in the foregoing method may be completed by using an integrated logic circuit of hardware in the processor 510 or an instruction in a form of software. The steps of the method disclosed with reference to the embodiments of the present invention may be directly performed by a hardware processor, or may be performed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 530. The processor 510 reads information in the memory 530, and completes the steps of the foregoing method in combination with the hardware of the processor 510. To avoid repetition, details are not described herein.

The wireless communications device 500 according to this embodiment of the present invention may be corresponding to the network device in the method in the embodiments of the present invention. In addition, units and modules in the wireless communications device 500 and the foregoing other operations and/or functions are separately intended to implement a corresponding procedure of the method 100 in FIG. 9. For brevity, details are not described herein.

According to the wireless communications device in this embodiment of the present invention, a frequency domain resource provided by a system is divided into at least two frequency domain resource groups, and when a terminal device needs to perform wireless communication, one or more frequency domain resource groups may be allocated to the terminal device from the at least two frequency domain resource groups, to support the terminal device in performing wireless communication, so that a corresponding frequency domain resource can be provided to the terminal device based on a requirement of the terminal device. Therefore, different user requirements can be flexibly met.

Figure 15:
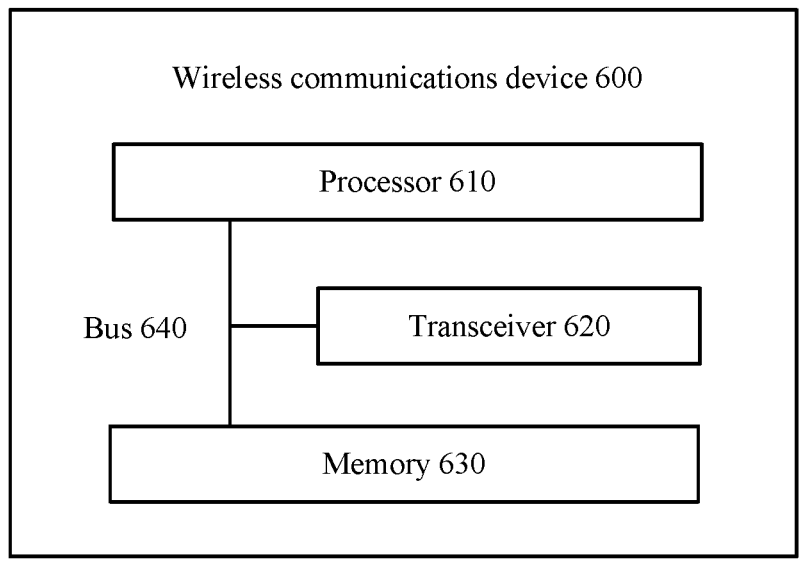
FIG. 15 is a schematic structural diagram of a wireless communications device according to another embodiment of the present invention.

FIG. 15 shows a schematic block diagram of a wireless communications device 600 according to an embodiment of the present invention. As shown in FIG. 15, the device 600 includes a processor 610 and a transceiver 620, and the processor 610 is connected to the transceiver 620. Optionally, the device 600 further includes a memory 630, and the memory 630 is connected to the processor 610. Optionally, the device 600 further includes a bus system 640. The processor 610, the memory 630, and the transceiver 620 may be connected by using the bus system 640. The memory 630 may be configured to store an instruction. The processor 610 is configured to execute the instruction stored in the memory 630, to control the transceiver 620 to send information or a signal. The device 600 is applied to a communications system using a frequency domain resource with a specified bandwidth. The frequency domain resource is divided into at least two frequency domain resource groups. Each frequency domain resource group includes at least one resource block. The at least two frequency domain resource groups belong to a same cell.

The processor 610 executes the instruction to control the transceiver 620 to receive first indication information sent by a network device. The first indication information is used to indicate a target frequency domain resource group, the target frequency domain resource group is determined by the network device from the at least two frequency domain resource groups, and the target frequency domain resource group includes at least one frequency domain resource group.

The processor 610 is configured to determine the target frequency domain resource group according to the first indication information.

The processor 610 is configured to control the transceiver 620 to perform wireless communication with the network device by using the target frequency domain resource group.

Optionally, the target frequency domain resource group includes at least two frequency domain resource groups; and the processor 610 is configured to control the transceiver 620 to transmit at least two transport blocks TBs to the network device by using the target frequency domain resource group, where a first TB in the at least two TBs is carried in a first frequency domain resource group in the target frequency domain resource group, a second TB in the at least two TBs is carried in a second frequency domain resource group in the target frequency domain resource group, and the first frequency domain resource group is different from the second frequency domain resource group.

Optionally, the processor 610 is further configured to control the transceiver 620 to send terminal capability information to the network device. The terminal capability information is used to indicate a maximum width of a frequency domain resource that can be processed by the wireless communications device 600, so that the network device determines the target frequency domain resource group according to the terminal capability information.

Optionally, the at least two frequency domain resource groups are continuously distributed in the frequency domain resource.

Optionally, the at least two frequency domain resource groups include a primary frequency domain resource group and at least one secondary frequency domain resource group.

Optionally, the processor 610 is configured to control the transceiver 620 to receive, by using the primary frequency domain resource group, the first indication information sent by the network device.

Optionally, a control channel is configured in the primary frequency domain resource group, and the control channel in the primary frequency domain resource group is used to transmit scheduling information of all frequency domain resource groups used in one scheduling period; and the processor 610 is configured to control the transceiver 620 to receive, by using the control channel in the primary frequency domain resource group, scheduling information that is sent by the network device and that is of the target frequency domain resource group.

Optionally, a control channel is configured in each frequency domain resource group, and each control channel is used to transmit scheduling information of a frequency domain resource group to which the control channel belongs; and the processor 610 is configured to control the transceiver 620 to receive, by using a control channel in the target frequency domain resource group, the scheduling information that is sent by the network device and that is of the target frequency domain resource group.

Optionally, an uplink feedback channel is configured in the primary frequency domain resource group, and the uplink feedback channel in the primary frequency domain resource group is used to transmit feedback information of downlink transmission carried in all frequency domain resource groups that are used in one downlink transmission period; and the processor 610 is configured to control the transceiver 620 to send, to the network device by using the uplink feedback channel in the primary frequency domain resource group, feedback information of downlink transmission carried in the target frequency domain resource group.

Optionally, an uplink feedback channel is configured in each frequency domain resource group, and each uplink feedback channel is used to transmit feedback information of downlink transmission carried in a frequency domain resource group to which the uplink feedback channel belongs; and the processor 610 is configured to control the transceiver 620 to send, to the network device by using an uplink feedback channel in the target frequency domain resource group, the feedback information of the downlink transmission carried in the target frequency domain resource group.

Optionally, a downlink feedback channel is configured in the primary frequency domain resource group, and the downlink feedback channel in the primary frequency domain resource group is used to transmit feedback information of uplink transmission carried in all frequency domain resource groups that are used in one uplink transmission period; and the processor 610 is configured to control the transceiver 620 to receive, by using the downlink feedback channel in the primary frequency domain resource group, feedback information that is sent by the network device and that is of uplink transmission carried in the target frequency domain resource group.

Optionally, a downlink feedback channel is configured in each frequency domain resource group, and each downlink feedback channel is used to transmit feedback information of uplink transmission carried in a frequency domain resource group to which the downlink feedback channel belongs; and the processor 610 is configured to control the transceiver 620 to receive, by using a downlink feedback channel in the target frequency domain resource group, the feedback information that is sent by the network device and that is of the uplink transmission carried in the target frequency domain resource group.

It should be understood that, in this embodiment of the present invention, the processor 610 may be a central processing unit (CPU), or the processor 610 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

The memory 630 may include a read-only memory and a random access memory, and provide an instruction and data to the processor 610. A part of the memory 630 may further include a nonvolatile random access memory. For example, the memory 630 may further store information about a device type.

In addition to a data bus, the bus system 640 may further include a power bus, a control bus, a status signal bus, and the like. However, for clarity description, various buses are marked as the bus system 640 in the figure.

In an implementation process, steps in the foregoing method may be completed by using an integrated logic circuit of hardware in the processor 610 or an instruction in a form of software. The steps of the method disclosed with reference to the embodiments of the present invention may be directly performed by a hardware processor, or may be performed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 630. The processor 610 reads information in the memory 630, and completes the steps of the foregoing method in combination with the hardware of the processor 610. To avoid repetition, details are not described herein.

The wireless communications device 600 according to this embodiment of the present invention may be corresponding to the target terminal device (such as the terminal device # A) in the method in the embodiments of the present invention. In addition, units and modules in the wireless communications device 600 and the foregoing other operations and/or functions are separately intended to implement a corresponding procedure of the method 200 in FIG. 11. For brevity, details are not described herein.

According to the wireless communications device in this embodiment of the present invention, a frequency domain resource provided by a system is divided into at least two frequency domain resource groups, and when a terminal device needs to perform wireless communication, one or more frequency domain resource groups may be allocated to the terminal device from the at least two frequency domain resource groups, to support the terminal device in performing wireless communication, so that a corresponding frequency domain resource can be provided to the terminal device based on a requirement of the terminal device. Therefore, different user requirements can be flexibly met.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is only an example. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the embodiments of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are only specific implementations of the present invention, but are not intended to limit the protection scope of the present invention. Any variation or replacement readily figured out by a person skilled in the art within the technical scope disclosed in the embodiments of the present invention shall fall within the protection scope of embodiments of the present invention.

What is claimed is:

1. A wireless communication method, applied to a communications system using a frequency domain resource with a specified bandwidth, wherein the frequency domain resource is divided into at least two frequency domain resource groups, each frequency domain resource group comprises at least one resource block, the at least two frequency domain resource groups belong to a same cell, and the method comprises:

determining, by a network device from the at least two frequency domain resource groups, a target frequency domain resource group to be allocated to a target terminal device, wherein the at least two frequency domain resource groups comprise a first frequency domain resource group and at least one second frequency domain resource group, and a control channel is configured in the first frequency domain resource group, the control channel is used to transmit scheduling information of all frequency domain resource groups;

sending, by the network device, first indication information to the target terminal device, wherein the first indication information is used to indicate the target frequency domain resource group;

sending, by the network device, scheduling information of the target frequency domain resource group to the target terminal device by using the control channel, wherein the target frequency domain resource group comprises at least two frequency domain resource groups; and performing, by the network device, wireless communication with the target terminal device by using the target frequency domain resource group, wherein the performing comprises;

transmitting, by the network device, at least two transport blocks (TBs) to the target terminal device by using the target frequency domain resource group, wherein a first TB in the at least two TBs is carried in a first frequency domain resource group in the target frequency domain resource group, a second TB in the at least two TBs is carried in a second frequency domain resource group in the target frequency domain resource group, and the first frequency domain resource group in the target frequency domain resource group is different from the second frequency domain resource group in the target frequency domain resource group.

2. The method according to claim 1, wherein the determining, by the network device from the at least two frequency domain resource groups, the target frequency domain resource group to be allocated to the target terminal device comprises:

receiving, by the network device, terminal capability information from the target terminal device, where the terminal capability information is used to indicate a maximum width of a frequency domain resource that can be processed by the target terminal device; and determining, by the network device from the at least two frequency domain resource groups according to the terminal capability information, the target frequency domain resource group to be allocated to the target terminal device.

3. The method according to claim 1, wherein the sending, by the network device, the first indication information to the target terminal device comprises:

sending, by the network device, the first indication information to the target terminal device by using the first frequency domain resource group.

4. The method according to claim 1, wherein the at least two frequency domain resource groups are in a one-to-one correspondence with at least two hybrid automatic repeat request (HARQ) entities, and each HARQ entity is configured to perform HARQ processing for a corresponding frequency domain resource group, and wherein a performing, by the network device, the wireless communication with the target terminal device by using the target frequency domain resource group comprises:

determining, by the network device, a HARQ entity corresponding to the target frequency domain resource group; and performing, by the network device according to the HARQ entity corresponding to the target frequency domain resource group, HARQ processing for transmission carried in the target frequency domain resource group.

5. A wireless communication method, applied to a communications system using a frequency domain resource with a specified bandwidth, wherein the frequency domain resource is divided into at least two frequency domain resource groups, each frequency domain resource group comprises at least one resource block, the at least two frequency domain resource groups belong to a same cell, and the method comprises:

receiving, by a target terminal device, first indication information from a network device, wherein the first indication information is used to indicate a target frequency domain resource group, the target frequency domain resource group is one of the at least two frequency domain resource groups, wherein the at least two frequency domain resource groups comprise a first frequency domain resource group and at least one second frequency domain resource group, and a control channel is configured in the first frequency domain resource group, the control channel is used to transmit scheduling information of all frequency domain resource groups;

receiving, by the target terminal device from the network device by using the control channel, scheduling information of the target frequency domain resource group, wherein the target frequency domain resource group comprises at least two frequency domain resource groups; and performing, by the target terminal device, wireless communication with the network device by using the target frequency domain resource group, wherein the performing comprises:

transmitting, by the target terminal device, at least two transport blocks (TBs) to the network device by using the target frequency domain resource group, wherein a first TB in the at least two TBs is carried in a first frequency domain resource group in the target frequency domain resource group, a second TB in the at least two TBs is carried in a second frequency domain resource group in the target frequency domain resource group, and the first frequency domain resource group in the target frequency domain resource group is different from the second frequency domain resource group in the target frequency domain resource group.

6. The method according to claim 5, further comprising:

sending, by the target terminal device, terminal capability information to the network device, where the terminal capability information is used to indicate a maximum width of a frequency domain resource that can be processed by the target terminal device, so that the network device determines the target frequency domain resource group according to the terminal capability information.

7. The method according to claim 5, wherein the at least two frequency domain resource groups are continuously distributed in the frequency domain resource.

8. The method according to claim 5, wherein the receiving, by the target terminal device, the first indication information from the network device comprises:

receiving, by the target terminal device, the first indication information to the network device by using the first frequency domain resource group.

9. An apparatus, applied to a communications system using a frequency domain resource with a specified bandwidth, wherein the frequency domain resource is divided into at least two frequency domain resource groups, each frequency domain resource group comprises at least one resource block, the at least two frequency domain resource groups belong to a same cell, and the apparatus comprises a processor and a memory,
- wherein the processor is configured to execute a program including processor-executable instructions stored in the memory to cause the apparatus to perform the following operations:
- receiving first indication information from a network device, wherein the first indication information is used to indicate a target frequency domain resource group, the target frequency domain resource group is one of the at least two frequency domain resource groups, wherein the at least two frequency domain resource groups comprise a first frequency domain resource group and at least one second frequency domain resource group, and a control channel is configured in the first frequency domain resource group, the control channel is used to transmit scheduling information of all frequency domain resource groups;
- receiving, from the network device, scheduling information of the target frequency domain resource group by using the control channel,
- wherein the target frequency domain resource group comprises at least two frequency domain resource groups; and
- performing wireless communication with the network device by using the target frequency domain resource group, wherein the performing comprises:
- transmitting at least two transport blocks (TBs) to the network device by using the target frequency domain resource group, wherein a first TB in the at least two TBs is carried in a first frequency domain resource group in the target frequency domain resource group, a second TB in the at least two TBs is carried in a second frequency domain resource group in the target frequency domain resource group, and the first frequency domain resource group in the target frequency domain resource group is different from the second frequency domain resource group in the target frequency domain resource group.

10. The apparatus according to claim 9, the operations further include: sending terminal capability information to the network device, where the terminal capability information is used to indicate a maximum width of a frequency domain resource that can be processed by the target terminal device.

11. The apparatus according to claim 9,
- wherein the receiving the first indication information from the network device comprises:
- receiving the first indication information from the network device by using the first frequency domain resource group.

* * * * *